(12) United States Patent
Ni

(10) Patent No.: US 9,693,260 B2
(45) Date of Patent: Jun. 27, 2017

(54) DATA TRANSMISSION SYSTEM AND METHOD

(71) Applicant: Huawei Technologies Co., Ltd., Shenzhen (CN)

(72) Inventor: Rui Ni, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 14/948,895

(22) Filed: Nov. 23, 2015

(65) Prior Publication Data

US 2016/0080972 A1     Mar. 17, 2016

Related U.S. Application Data

(63) Continuation of application No. PCT/CN2013/087333, filed on Nov. 18, 2013.

(30) Foreign Application Priority Data

May 24, 2013 (CN) .......................... 2013 1 0196296

(51) Int. Cl.
*H04L 12/741* (2013.01)
*H04W 28/02* (2009.01)
(Continued)

(52) U.S. Cl.
CPC ......... *H04W 28/0289* (2013.01); *H04W 8/22* (2013.01); *H04W 72/12* (2013.01);
(Continued)

(58) Field of Classification Search
None
See application file for complete search history.

(56) References Cited

U.S. PATENT DOCUMENTS

| 7,389,102 B2 | 6/2008 | Li |
| 2004/0063455 A1 | 4/2004 | Eran et al. |

(Continued)

FOREIGN PATENT DOCUMENTS

| CN | 101909363 A | 12/2010 |
| CN | 102055800 A | 5/2011 |

(Continued)

OTHER PUBLICATIONS

Banikazemi et al., "Meridian: An SDN Platform for Cloud Network Services," Software Defined Networks, IEEE Communications Magazine, pp. 120-127, Institute of Electrical and Electronics Engineers, New York, New York (Feb. 2013).

*Primary Examiner* — Chi H Pham
*Assistant Examiner* — Soon-Dong D Hyun
(74) *Attorney, Agent, or Firm* — Leydig, Voit & Mayer, Ltd.

(57) ABSTRACT

Provided are a data packet transmission system and method, the system includes: an Agent device, a first connecting device, a MAC array, a second connecting device, a PHY array, a third connecting device and an RF array, where the Agent device sends data of a first data frame to the first connecting device, and the first connecting device sends a data packet to a destination MAC device in the MAC array; the destination MAC device sends a second data frame to the second connecting device; the second connecting device sends the data packet to a destination PHY device in the PHY array; the destination PHY device sends a third data frame to the third connecting device; and the third connecting device sends the data packet to a destination RF device in the RF array, and the destination RF device sends the data packet to a user side.

20 Claims, 23 Drawing Sheets

(51) Int. Cl.
*H04W 72/12* (2009.01)
*H04W 76/02* (2009.01)
*H04W 8/22* (2009.01)
H04W 84/12 (2009.01)
H04L 12/721 (2013.01)

(52) U.S. Cl.
CPC ......... *H04W 76/02* (2013.01); *H04W 76/022* (2013.01); *H04L 45/66* (2013.01); *H04L 45/74* (2013.01); *H04W 84/12* (2013.01)

(56) References Cited

U.S. PATENT DOCUMENTS

| | | | |
|---|---|---|---|
| 2010/0085884 A1* | 4/2010 | Srinivasan | H04W 16/08 370/252 |
| 2010/0303096 A1 | 12/2010 | Kasher et al. | |
| 2011/0002302 A1* | 1/2011 | Ding | H04W 76/041 370/331 |
| 2012/0106514 A1* | 5/2012 | Zheng | H04W 36/32 370/331 |
| 2012/0327898 A1* | 12/2012 | Lu | H04W 36/30 370/331 |
| 2013/0094367 A1* | 4/2013 | Zou | H04L 12/189 370/241 |
| 2014/0092742 A1* | 4/2014 | Chou | H04W 52/0258 370/235 |

FOREIGN PATENT DOCUMENTS

| | | |
|---|---|---|
| CN | 102857567 A | 1/2013 |
| CN | 102869127 A | 1/2013 |
| WO | WO 2012006513 A1 | 1/2012 |

* cited by examiner

| direction | Source device ID | payload |
|---|---|---|

Fig. 3

| source device ID | number | destination device ID |
|---|---|---|

Fig. 4

DATA TRANSMISSION SYSTEM AND METHOD

CROSS REFERENCE OF RELATED APPLICATIONS

This application is a continuation of International Patent Application No. PCT/CN2013/087333, filed on Nov. 18, 2013, which claims priority to Chinese Patent Application No. 201310196296.4, filed on May 24, 2013, both of which are hereby incorporated by reference in their entireties.

FIELD

The disclosure relates to the field of wireless communication technology, and in particular to a data transmission system and a method.

BACKGROUND

Currently, wireless fidelity (Wireless Fidelity, WiFi) networking mainly includes distributed WiFi networking and centralized WiFi networking. The centralized WiFi networking has been applied widely, a part of functions of an access point (Access Point, AP) in the centralized WiFi networking is replaced by an access point controller (Access point Controller, AC), an interaction and coordination mechanism between multiple APs is realized by the AC, thus network performance and user experience are improved.

WiFi networking having "ultra-thin AP+AC" is an existing centralized WiFi networking, in which the AP is degenerated to a simple physical layer (Physical Layer, PHY) and a radio frequency (Radio Frequency, RF) device and only realize a PHY operation process defined in 802.11 protocol. The AC takes over all data packet traffic of an Internet Protocol (Internet Protocol, IP) layer and a Media Access Control (Media Access Control, MAC) layer, and determines the data packet traffic. Signaling interaction with all stations (Station, STA) is performed by the AC. Computation amount of AC processing is large since all scheduling tasks are processed on a single AC, therefore, the WiFi networking has a problem of performance bottleneck.

SUMMARY

A data transmission system and a method are provided in the embodiments of the present disclosure, which can solve a problem of performance bottleneck in WiFi networking.

In a first aspect, a data transmission system provided in the embodiments of the present disclosure includes: an agent (Agent) device, a first connecting device, an MAC array including at least one MAC device, a second connecting device, a PHY array including at least one PHY device, a third connecting device and an RF array including at least one RF device, where the Agent device is configured to send a first data frame to the first connecting device, where the first data frame includes a data packet and first identification information of the Agent device;

the first connecting device is configured to send the data packet to a destination MAC device in the MAC array based on the first identification information;

the destination MAC device is configured to send a second data frame to the second connecting device, where the second data frame includes the data packet and second identification information of the destination MAC device;

the second connecting device is configured to send the data packet to a destination PHY device in the PHY array based on the second identification information;

the destination PHY device is configured to send a third data frame to the third connecting device, where the third data frame includes the data packet and third identification information of the destination PHY device;

the third connecting device is configured to send the data packet to a destination RF device in the RF array based on the third identification information; and the destination RF device is configured to send the data packet to a user side.

In a first possible implementation of the first aspect, the first connecting device is configured to send the data packet to the destination MAC device based on the first identification information, where the destination MAC device is preassigned to perform rapid transmission;

the second connecting device is configured to send the data packet to the destination PHY device based on the second identification information, where the destination PHY device is preassigned to perform rapid transmission; and the third connecting device is configured to send the data packet to the destination RF device based on the third identification information, where the destination RF device is preassigned to perform rapid transmission.

In conjunction with the first aspect, in a second possible implementation of the first aspect, the data packet includes user information, and the system has routing table rules established for the user information;

the first connecting device is configured to send the data packet to the destination MAC device based on the first identification information and a first routing table rule, where the destination MAC device is assigned, in accordance with the first routing table rule, to receive the data packet, and the first routing table rule is preestablished for the user information;

the second connecting device is configured to send the data packet to the destination PHY device based on the second identification information and a second routing table rule, where the destination PHY device is assigned, in accordance with the second routing table rule, to receive the data packet, and the second routing table rule is preestablished for the user information; and the third connecting device is configured to send the data packet to the destination RF device based on the third identification information and a third routing table rule, where the destination RF device is assigned, in accordance with the third routing table rule, to receive the data packet, and the third routing table rule is preestablished for the user information.

In conjunction with the second possible implementation of the first aspect, in a third possible implementation of the first aspect, the system further includes:

a scheduler, configured to allocate transmission resource to the user information, generate the first routing table rule, the second routing table rule and the third routing table rule based on the transmission resource, and send the first routing table rule, the second routing table rule and the third routing table to the first connecting device, the second connecting device and the third connecting device, respectively; and the Agent device is further configured to send the user information to the scheduler.

In conjunction with the second possible implementation of the first aspect or the third possible implementation of the first aspect, in a fourth possible implementation of the first aspect, the user information includes:

source address information and destination address information.

In conjunction with the second possible implementation of the first aspect or the third possible implementation of the first aspect, in a fifth possible implementation of the first aspect, the first connecting device is further configured to select at least one destination MAC device from the at least one MAC device based on the first routing table rule, and send the data packet to one of the at least one destination MAC device;

the second connecting device is further configured to select at least one destination PHY device from the at least one PHY device based on the second routing table rule, and send the data packet to one of the at least one destination PHY device; and the third connecting device is further configured to select at least one destination RF device from the at least one RF device based on the third routing table rule, and send the data packet to one of the at least one destination RF device.

In a second aspect, a data transmission system according to the embodiments of the present disclosure includes: an MAC array including at least one MAC device, a second connecting device, a PHY array including at least one PHY device, a third connecting device and an RF array including at least one RF device, where:

a destination RF device is configured to send a first data frame to the third connecting device, where the first data frame includes a data packet and first identification information of the destination RF device, and the destination RF device is included in the RF array;

the third connecting device is configured to send the data packet to a destination PHY device in the PHY array based on the first identification information;

the destination PHY device is configured to send a second data frame to the second connecting device, where the second data frame includes the data packet and second identification information of the destination PHY device;

the second connecting device is configured to send the data packet to a destination MAC device in the MAC array based on the second identification information; and the destination MAC device is configured to perform an MAC layer operation process on the data packet.

In a first possible implementation of the second aspect, the system further includes: a first connecting device and an Agent device, where:

the destination MAC device is further configured to send a third data frame to the first connecting device in a case that the data packet is sent to a network side, where the third data frame includes the data packet and third identification information of the destination MAC device;

the first connecting device is configured to send the data packet to the Agent device based on the third identification information; and the Agent device is configured to send the data packet to the network side.

In conjunction with any one of implementations described above, in a second possible implementation of the second aspect, the third connecting device is configured to send the data packet to the destination PHY device, where the destination PHY device is preassigned to perform rapid transmission; and the second connecting device is configured to send the data packet to the destination MAC device, where the destination MAC device is preassigned to perform rapid transmission.

In conjunction with the second possible implementation of the second aspect, in a third possible implementation of the second aspect, the data packet includes user information; the system further includes a scheduler, where:

the third connecting device is further configured to send the user information included in the data packet to the scheduler; and the scheduler is configured to allocate transmission resource to the user information, generate a third routing table rule and a second routing table rule based on the transmission resource, and send the third routing table rule and the second routing table rule to the third connecting device and the second connecting device, respectively.

In conjunction with the first possible implementation of the second aspect, in a fourth possible implementation of the second aspect, the data packet includes user information, and the system has routing table rules established for the user information;

the third connecting device is configured to send the data packet to the destination PHY device based on a third routing table rule, where the destination PHY device is assigned, in accordance with the third routing table rule, to receive the data packet, and the third routing table rule is preestablished for the user information;

the second connecting device is configured to send the data packet to the destination MAC device based on a second routing table rule, where the destination MAC device is assigned, in accordance with the second routing table rule, to receive the data packet, and the second routing table rule is preestablished for the user information; and the first connecting device is configured to send the data packet to the Agent device based on a first routing table rule, where the Agent device is assigned, in accordance with the first routing table rule, to receive the data packet, and the first routing table rule is preestablished for the user information.

In conjunction with the fourth possible implementation of the second aspect, in a fifth possible implementation of the second aspect, the system further includes a scheduler, where:

the destination MAC device is further configured to send the user information to the scheduler; and the scheduler is further configured to allocate transmission resource to the user information, generate the first routing table rule based on the transmission resource, and send the first routing table rule to the first connecting device.

In a third aspect, a data transmission method applied to the data transmission system is provided by the embodiments of the present disclosure, the system includes an Agent device, a first connecting device, an MAC array including at least one MAC device, a second connecting device, a PHY array including at least one PHY device, a third connecting device and an RF array including at least one RF device, and the method includes:

sending, by the Agent device, a first data frame to the first connecting device, where the first data frame includes a data packet and first identification information of the Agent device;

sending, by the first connecting device, the data packet to a destination MAC device in the MAC array based on the first identification information;

sending, by the destination MAC device, a second data frame to the second connecting device, where the second data frame includes the data packet and second identification information of the destination MAC device;

sending, by the second connecting device, the data packet to a destination PHY device in the PHY array based on the second identification information;

sending, by the destination PHY device, a third data frame to the third connecting device, where the third data frame includes the data packet and third identification information of the destination PHY device;

sending, by the third connecting device, the data packet to a destination RF device in the RF array based on the third identification information; and sending, by the destination RF device, the data packet to a user side.

In a first possible implementation of the third aspect, the sending, by the first connecting device, the data packet to the destination MAC device in the MAC array based on the first identification information includes: sending, by the first connecting device, the data packet to the destination MAC device based on the first identification information, where the destination MAC device is preassigned to perform rapid transmission;

the sending, by the second connecting device, the data packet to the destination PHY device in the PHY array based on the second identification information includes: sending, by the second connecting device, the data packet to the destination PHY device based on the second identification information, where the destination PHY device is preassigned to perform rapid transmission; and the sending, by the third connecting device, the data frame to the destination RF device in the RF array based on the third identification information includes: sending, by the third connecting device, the data frame to the destination RF device based on the third identification information, where the destination RF device is preassigned to perform rapid transmission.

In conjunction with the third aspect, in a second possible implementation of the third aspect, the data packet includes user information, and the system has routing table rules established for the user information, where the sending, by the first connecting device, the data packet to the destination MAC device in the MAC array based on the first identification information includes: sending, by the first connecting device, the data packet to the destination MAC device based on the first identification information and a first routing table rule, where the destination MAC device is assigned, in accordance with the first routing table rule, to receive the data packet, and the first routing table rule is pre-established for the user information;

the sending, by the second connecting device, the data packet to the destination PHY device in the PHY array based on the second identification information includes: sending, by the second connecting device, the data packet to the destination PHY device based on the second identification information and a second routing table rule, and the destination PHY device is assigned, in accordance with the second routing table rule, to receive the data packet, and the second routing table rule is preestablished for the user information; and the sending, by the third connecting device, the data frame to the destination RF device in the RF array based on the third identification information includes: sending, by the third connecting device, the data packet to the destination RF device based on the third identification information and a third routing table rule, where the destination RF device is assigned, in accordance with the third routing table rule, to receive the data packet, and the third routing table rule is preestablished for the user information.

In conjunction with the second possible implementation of the third aspect, in a third possible implementation of the third aspect, before the sending, by the first connecting device, the data packet to the destination MAC device in the MAC array based on the first identification information and the first routing table rule, the method further includes:

allocating, by a scheduler, transmission resource to the user information, generating the first routing table rule, the second routing table rule and the third routing table rule based on the transmission resource, and sending the first routing table rule, the second routing table rule and the third routing table rule to the first connecting device, the second connecting device and the third connecting device, respectively, where the user information is sent by the Agent device to the scheduler.

In conjunction with the second possible implementation of the third aspect or the third possible implementation of the third aspect, in a fourth possible implementation of the third aspect, the user information includes:

source address information and destination address information.

In conjunction with the second possible implementation way of the third aspect or the third possible implementation of the third aspect, in a fifth possible implementation of the third aspect, the sending, by the first connecting device, the data packet to the destination MAC device based on the first identification information and the first routing table rule includes: selecting, by the first connecting device, at least one destination MAC device from the at least one MAC device based on the first identification information and the first routing table rule, and sending the data packet to one of the at least one destination MAC device;

the sending, by the second connecting device, the data packet to the destination PHY device based on the second identification information and the second routing table rule includes: selecting, by the second connecting device, at least one destination PHY device from the at least one PHY device based on the second identification information and the second routing table rule, and sending the data packet to one of the at least one destination PHY device; and the sending, by the third connecting device, the data frame to the destination RF device based on the third identification information and the third routing table rule includes: selecting, by the third connecting device, at least one destination RF device from the at least one RF device based on the third identification information and the third routing table rule, and sending the data packet to one of the at least one destination RF device.

In a fourth aspect, a data transmission method applied to the data transmission system is provided by the embodiments of the present disclosure, the system includes an MAC array including at least one MAC device, a second connecting device, a PHY array including at least one PHY device, a third connecting device and an RF array including at least one RF device, and the method includes:

sending, by a destination RF device, a first data frame to the third connecting device, where the first data frame includes a data packet and first identification information of the destination RF device, and the destination RF device is included in the RF array;

sending, by the third connecting device, the data packet to a destination PHY device in the PHY array based on the first identification information;

sending, by the destination PHY device, a second data frame to the second connecting device, where the second data frame includes the data packet and second identification information of the destination PHY device;

sending, by the second connecting device, the data packet to a destination MAC device in the MAC array based on the second identification information; and performing, by the destination MAC device, an MAC layer operation process on the data packet.

In a first possible implementation of the fourth aspect, the system further includes: a first connecting device and an Agent device, where the destination MAC device is configured to send a third data frame to the first connecting device in a case that the data packet is sent to a network side, where the third data frame includes the data packet and third identification information of the destination MAC device;

the first connecting device is configured to send the data packet to the Agent device based on the third identification information; and the Agent device is configured to send the data packet to the network side.

In conjunction with any one of the implementations described above of the fourth aspect, in a second possible implementation of the fourth aspect, the sending, by the third connecting device, the data packet to the destination PHY device in the PHY array based on the first identification information includes: sending, by the third connecting device, the data packet to the destination PHY device based on the first identification information, where the destination PHY device is preassigned to perform rapid transmission; and the sending, by the second connecting device, the data packet to the destination MAC device in the MAC array based on the second identification information includes: sending, by the second connecting device, the data packet to the destination MAC device based on the second identification information, where the destination MAC device is preassigned to perform rapid transmission.

In conjunction with the second possible implementation of the fourth aspect, in a fourth possible implementation of the fourth aspect, the system further includes a scheduler, and after the sending, by the destination RF device, the first data frame to the third connecting device, the method further includes:

sending, by the third connecting device, user information included in the data packet to the scheduler; and allocating, by the scheduler, transmission resource to the user information, generating, a third routing table rule and a second routing table rule based on the transmission resource, and sending the third routing table rule and the second routing table rule to the third connecting device and the second connecting device, respectively.

In conjunction with the first possible implementation of the fourth aspect, in a fifth possible implementation of the fourth aspect, the data packet includes user information, and the system has routing table rules established for the user information;

the sending, by the third connecting device, the data packet to the destination PHY device in the PHY array based on the first identification information includes: sending, by the third connecting device, the data packet to the destination PHY device based on the first identification information and a third routing table rule, where the destination PHY device is assigned, in accordance with the third routing table rule, to receive the data packet, and the first routing table rule is preestablished for the user information;

the sending, by the second connecting device, the data packet to the destination MAC device in the MAC array based on the second identification information includes: sending, by the second connecting device, the data packet to the destination MAC device based on the second identification information and a second routing table rule, where the destination MAC device is assigned, in accordance with the second routing table rule, to receive the data packet, and the second routing table rule is preestablished for the user information; and the sending, by the first connecting device, the data packet to the Agent device based on the third identification information includes: sending, by the first connecting device, the data packet to the Agent device based on the third identification information and a first routing table rule, and the Agent device is assigned, in accordance with the third routing table rule, to receive the data packet, and the third routing table rule is preestablished for the user information.

In conjunction with the fifth possible implementation of the fourth aspect, in a sixth possible implementation of the fourth aspect, the system further includes a scheduler, and before the sending, by the first connecting device, the data packet to the Agent device based on the third identification information and the first routing table rule, the method further includes:

sending, by the destination MAC device, the user information to the scheduler; and allocating, by the scheduler, transmission resource to the user information, generating a first routing table rule based on the transmission resource, and sending the first routing table rule to the first connecting device.

In the technical solution described above, the Agent device transmits the data packet to the MAC device via the first connecting device, the destination MAC device transmits the data packet to the destination PHY device via the second connecting device, the destination PHY device transmits the data packet to the destination RF device via the third connecting device, and the destination RF device transmits the data packet to the user side. In this way, a scheduling task for the data packet is realized by multiple devices, and therefore the problem of performance bottleneck in the WiFi networking can be solved.

BRIEF DESCRIPTION OF THE DRAWINGS

In order to illustrate technical solutions in embodiments of the present disclosure or the conventional art more clearly, drawings to be used in the description of the embodiments or the conventional art are described briefly hereinafter. Apparently, the drawings in the following description are only for some embodiments of the present disclosure. For those skilled in the art, other drawings may further be obtained based on the provided drawings without any creative work.

FIG. 3 and FIG. 4 are a schematic structural view of an optional frame header and a schematic structural view of a routing table rule according to the embodiments of the present disclosure;

DETAILED DESCRIPTION OF THE EMBODIMENTS

The technical solutions according to the embodiments of the present disclosure will be described clearly and completely as follows in conjunction with the drawings in the embodiments of the present disclosure. It is apparent that the described embodiments are merely a part of the embodiments of the present disclosure rather than all embodiments. All other embodiments obtained by those skilled in the art without any creative work based on the embodiments in the present disclosure will fall within the scope of protection of the present disclosure.

The devices described in the embodiments of the present disclosure, such as, an Agent device, a first connecting device, an MAC array, a second connecting device, a PHY array, a third connecting device, an RF array and a scheduler may be disposed in multiple communication equipments respectively. That is, a communication equipment includes the Agent device, the first connecting device, the MAC array, the second connecting device, the PHY array, the third connecting device, the RF array or the scheduler. multiple devices of the Agent device, the first connecting device, the MAC array, a second connecting device, the PHY array, the third connecting device, the RF array and the scheduler may be disposed in one communication equipment. That is, a communication equipment may include multiple devices of the devices described above, for example, the first connecting device, the second connecting device and the third connecting device are disposed in one equipment; the Agent device, the first connecting device, the MAC array, the second connecting device, the PHY array, the third connecting device, the RF array and the scheduler may all be disposed in one communication equipment, that is, the communication equipment includes all the devices described above. Specifically, the MAC array described above may include at least one MAC device, and may include different MAC devices, such as, at least one rapid transmission MAC device and at least one dynamic transmission MAC device. The rapid transmission MAC device and the dynamic transmission MAC device can refer to a specific description for the following embodiment. The PHY array described above may include at least one PHY device, and may include different PHY devices, such as, at least one rapid transmission PHY device and at least one dynamic transmission PHY device. The rapid transmission PHY device and the dynamic transmission PHY device can refer to a specific description for the following embodiment. The RF array described above may include at least one RF device, and may include different RF devices, such as, at least one rapid transmission RF device and at least one dynamic transmission RF device. The rapid transmission RF device and the dynamic transmission RF device can refer to a specific description for the following embodiment.

Figure 1:
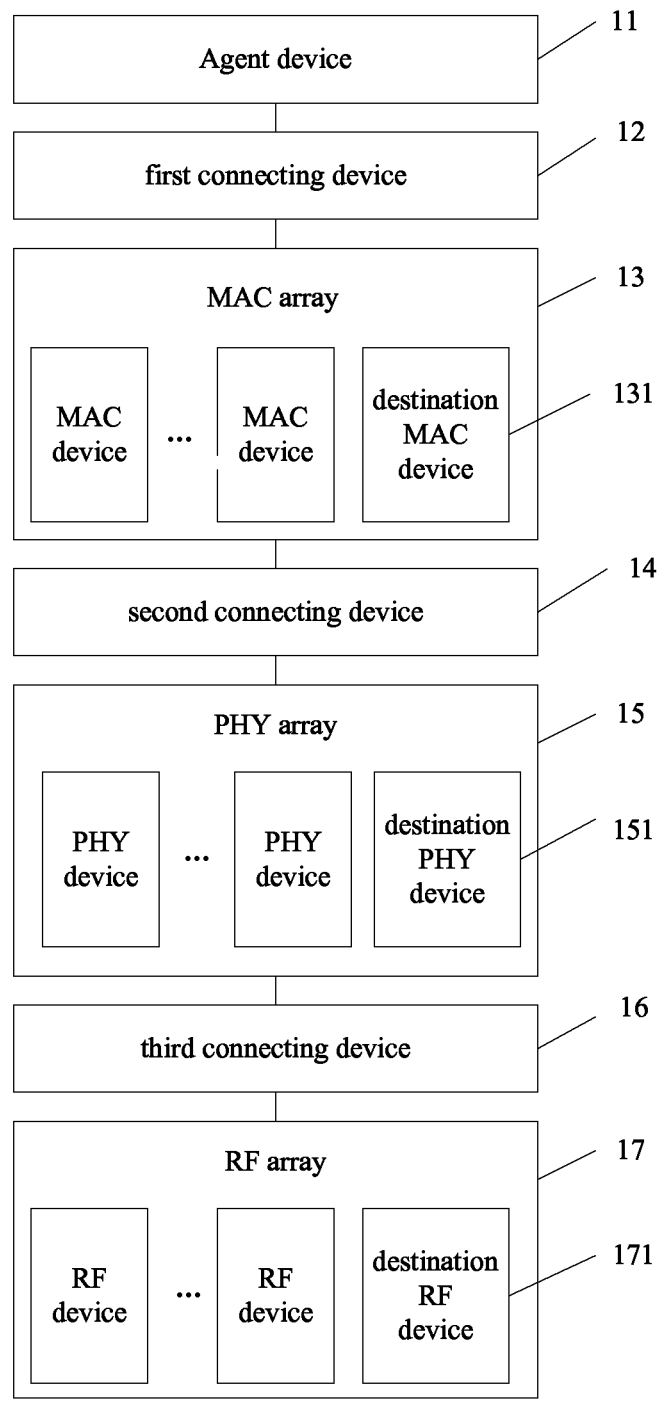
FIG. 1 is a schematic structural view of a data transmission system according to the embodiments of the present disclosure.

FIG. 1 is a schematic structural view of a data transmission system according to the embodiments of the present disclosure, as shown in FIG. 1, the data transmission system includes: an Agent device 11, a first connecting device 12, an MAC array 13 including at least one MAC device, a second connecting device 14, a PHY array 15 including at least one PHY device, a third connecting device 16 and an RF array 17 including at least one RF device.

Specifically, the Agent device 11 is configured to send a first data frame to the first connecting device 12, where the first data frame includes a data packet and first identification information of the Agent device 11.

The Agent device 11 may generate the first data frame including the data packet and the first identification information. The first identification information may be a frame header of the data frame, and the frame header may further include direction information and a payload (Payload) of the data packet. The direction information is used to indicate whether the data packet is transmitted from a network side to a user side or transmitted from the user side to the network side. The direction information in the embodiments of the present disclosure may be used to indicate that the data packet is transmitted from the network side to the user side. For example, an identifier "0" may indicate that the data packet is transmitted from the network side to the user side, and an identifier "1" may indicate that the data packet is transmitted from the user side to the network side. The destination MAC device 131 being an MAC device included in the at least one MAC device may mean that the destination device 131 being at least one MAC device included in the MAC array 13, and the destination MAC device 131 being one or more MAC device of the at least one MAC device.

The first connecting device 12 is configured to send the data packet to the destination MAC device 131 in the MAC array 13 based on the first identification information.

The destination MAC device is configured to send a second data frame to the second connecting device 14, where the second data frame includes the data packet and second identification information of the destination MAC device 131.

The destination MAC device 131 generates the second data frame including the second identification information and the data packet upon acquiring the data packet described above, where the data frame may have a same format as the first data frame. The destination MAC device 131 may further perform MAC layer operation on the data packet, such as, scanning, association, authentication and security, and generate the second data frame based on the data packet after the MAC layer operation and the second identification information. The destination PHY device 151 being a PHY device included in the at least one PHY device may mean that the destination PHY device 151 being at least one PHY device included in the PHY array 15, and the destination PHY device 151 being one or more PHY device of the at least one PHY device.

The second connecting device 14 is configured to send the data packet to the destination PHY device 151 in the PHY array 15 based on the second identification information.

The destination PHY device 151 is configured to send a third data frame to the third connecting device 16, where the third data frame includes the data packet and the third identification information of the destination PHY device 151.

The destination PHY device 151 generates the third data frame including the third identification information and the data packet upon acquiring the data packet described above, the data frame may have a same format as the first data frame. The destination PHY device 151 may further perform PHY layer operation on the data packet, such as, modulating, encoding, grouping and checking, and generate the third data frame based on the data packet after the PHY layer operation and the third identification information. The destination RF device 171 being an RF device included in the at least one RF device may mean that the destination RF device 171 being at least one RF device included in the RF array 17, and the destination RF device 171 being one or more RF device of the at least one PHY device.

The third connecting device 16 is configured to send the data packet to the destination RF device 171 in the RF array 17 based on the third identification information.

The destination RF device 171 is configured to send the data packet to the user side.

The destination RF device 171 may further perform RF layer operation on the data packet, such as, a digital-to-analogue conversion, an analogue-to-digital conversion, sampling and filtering, and send the data packet after the RF layer operation to the user side.

In the technical solution described above, the Agent device transmits the data packet to the first MAC device via the first connecting device, the destination MAC device transmits the data packet to the destination PHY device via the second connecting device, the destination PHY device transmits the data packet to the destination RF device via the third connecting device, and the destination RF device transmits the data packet to the user side. In this way, a scheduling task for the data packet is realized by multiple devices, and therefore the problem of performance bottleneck in the WiFi networking can be solved.

Figure 2:
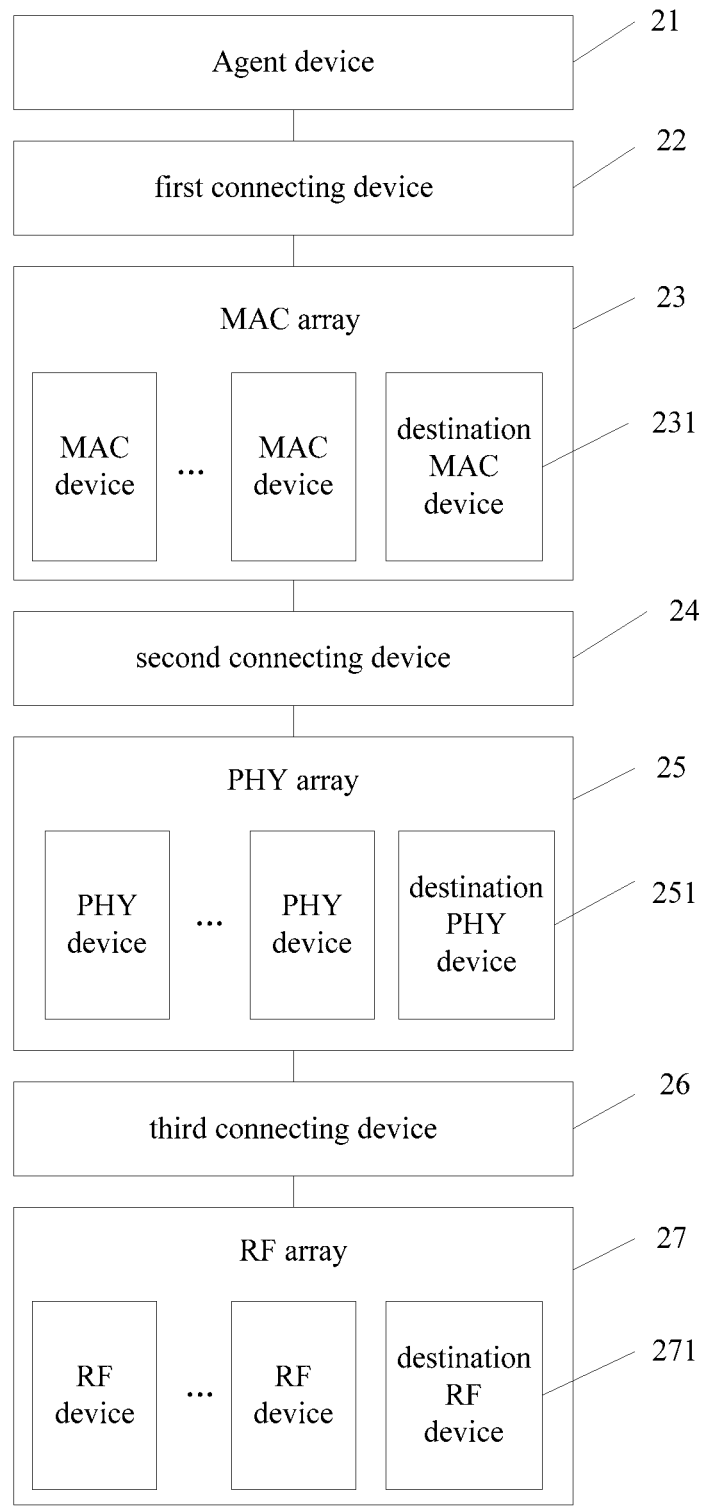
FIG. 2 is a schematic structural view of another data transmission system according to the embodiments of the present disclosure.

FIG. 2 is a schematic structural view of a data transmission system according to the embodiments of the present disclosure, as shown in FIG. 2, the data transmission system includes: an Agent device 21, a first connecting device 22, an MAC array 23 including at least one MAC device, a second connecting device 24, a PHY array 25 including at least one PHY device, a third connecting device 26 and an RF array 27 including at least one PHY device.

Specifically, the Agent device 21 is configured to send a first data frame to the first connecting device 22, where the first data frame includes a data packet and first identification information on the Agent device.

The Agent device 21 may generate the data frame including the data packet and the first identification information. The first identification information may be a frame header of the data frame, and the frame header may further include direction information and a payload (Payload) of the data packet. The direction information is used to indicate whether the data packet is transmitted from a network side to a user side or transmitted from the user side to the network side. The direction information in the embodiments of the present disclosure may be used to indicate that the data packet is transmitted from the network side to the user side. For example, an identifier "0" may indicate that the data packet is transmitted from the network side to the user side, and an identifier "1" may indicate that the data packet is transmitted from the user side to the network side. A format of the frame header of the first data frame may be as shown in FIG. 3, in FIG. 3, "direction" in FIG. 3 is used to indicate the direction information on the data packet, "source device ID" is used to indicate identification information on sending the data packet, for example, the first identification information.

The data packet described above may be an IP data packet, the Agent device may further parse the data packet to obtain user information. That is, the Agent device may perform IP layer operation on the data packet. The user information may include source address information and destination address information on the data packet. The Agent device transmits the parsed data packet to a buffer device (not shown in the drawings) via a buffer interface after parsing the IP data packet, and further obtains a buffered data packet from the buffer device (not shown in the drawings), and generates the first data frame including the obtained data packet and the first identification information described above. Therefore, the system may further include the buffer device (not shown in the drawings).

The data packet described above may further be a data packet sent from the network side to the Agent device.

The first connecting device 22 is configured to send the data packet to a destination MAC device 231 in the MAC array 23 based on the first identification information.

The first connecting device 22 may parse the first data packet upon acquiring the data frame described above, to obtain the first identification information, therefore, the first connecting device 22 can know which device sends the first data frame. The first connecting device 22 selects the destination MAC device 231 from the at least one MAC device included in the MAC array 23 based on the first identification information. Specifically, a way of selecting the destination MAC device 231 may be to select an MAC device, included in the MAC array 23, preassigned to perform rapid transmission as the destination MAC device 231 described above, or to select an MAC device assigned, in accordance with a first routing table rule, to receive the data packet from at least one MAC device included in the MAC array 23 as the destination MAC device 231 based on the first routing table rule.

The destination MAC device 231 is configured to send a second data frame to the second connecting device 24, where the second data frame includes the data packet and second identification information on the destination MAC device.

Specifically, the second data frame may have a same format as the first data frame, which is not described repeatedly here. The destination MAC device 231 may further perform MAC layer operation on the data packet, and send the data packet after the MAC layer operation and the second identification information to the second connecting device 24.

The second connecting device 24 is configured to send the data packet to a destination PHY device 251 in the PHY array based on the second identification information, and the destination PHY device 251 is included in the at least one PHY device.

The second connecting device 24 may parse the second data frame upon acquiring the data frame described above, to obtain the second identification information, therefore, the second connecting device 24 can know which device sends the second data frame. The second connecting device 24 selects the destination PHY device 251 from at least one PHY device included in the PHY array 25 based on the second identification information. Specifically, a way of selecting the destination PHY device may be to select a PHY device, included in the PHY array 25, preassigned to perform rapid transmission as the destination PHY device 251 described above, or to select a PHY device assigned, in accordance with a second routing table rule, to receive the data packet from at least one PHY device included in the PHY array 25 as the destination PHY device 251 based on the second routing table rule.

The destination PHY device 251 is configured to send a third data frame to the third connecting device 26, where the third data frame includes the data packet and third identification information on the destination PHY device.

Specifically, the third data frame may have a same as the first data frame, which is not described repeatedly here. The destination PHY device 251 may further perform PHY layer operation on the data packet, and send the data packet after the PHY layer operation and the third identification information to the third connecting device 26.

The third connecting device 26 is configured to send the data packet to a destination RF device 271 in the RF array 27 based on the third identification information.

The third connecting device 26 may parse the third data frame after acquiring the data frame described above, to obtain the third identification information, therefore, the third connecting device 26 can know which device sends the third data frame. The third connecting device 26 selects the destination RF device 271 from at least one RF device included in the RF array 27 based on the third identification information. Specifically, a way of selecting the destination RF device may be to select a RF device, included in the RF array 27, preassigned to perform rapid transmission as the destination RF device 271 described above, or to select an RF device assigned, in accordance with the third routing table rule, to receive the data packet from at least one RF device included in the RF array 27 as the destination RF device 271 based on a second routing table rule.

The destination RF device 271 is configured to send the data packet to the user side.

The destination RF device 271 may further perform RF layer operation on the data packet, such as, a digital-to-analogue conversion, an analogue-to-digital conversion, sampling and filtering, and then send the data packet after the RF layer operation to the user side.

As an optional embodiment, the first connecting device 22 may further be configured to send the first data frame to the destination MAC device 231 in the MAC array 23 based on the first identification information, where the destination MAC device 231 is preassigned to perform rapid transmission. The MAC array 23 may include the rapid transmission MAC device, of course, the MAC array 23 may include other MAC device in addition to the rapid transmission MAC device. The destination MAC device 231 may generate the second data frame described above upon receiving the data packet, and send the second data frame to the second connecting device 24.

The second connecting device 24 may further be configured to send the data packet to the destination PHY 251 based on the second identification information, and the destination PHY device 251 is preassigned to perform rapid transmission; the PHY array 25 may include the rapid transmission PHY, of course, may also include other PHY device. The destination PHY device 251 may generate the third data frame described above upon receiving the data packet, and send the third data frame to the third connecting device 26.

The third connecting device 26 is configured to send the data packet to the destination RF device 271 based on the third identification information, where the destination RF device 271 is preassigned to perform rapid transmission. The RF array 27 may include the RF device configured to perform rapid transmission, of course, may also include other RF device.

In the embodiment, the data packet may be transmitted to the user side by rapid transmission, that is, the first connecting device 22, the second connecting device 24 and the third connecting device 26 do not route the data packet. In the embodiment, an unowned data packet can also be transmitted, that is, the data packet described above is an unowned data packet, no routing table rule is established for the user information in the system. That is, the data packet including user information having no a routing table rule is the unowned data packet. Of course, in the embodiment, rapid transmission may further be performed on the data packet including user information having a routing table rule.

As an optional embodiment, the data packet includes user information, and the system has a routing table rule established for the user information.

The first connecting device 22 may further be configured to send the data packet to the destination MAC device 231 based on the first identification information and a first routing table rule, where the destination MAC device 231 is assigned, in accordance with the first routing table rule, to receive the data packet, and the first routing table rule is a routing table rule preestablished for the user information.

The first routing table rule described above may be as shown in FIG. 4, specifically, "source device ID" in FIG. 4 indicates identification information on a device configured to send the data frame. For example, the first data frame is sent by the Agent device, the source device ID in the first routing table rule may also be the first identification information described above, "number" in FIG. 4 is used to indicate the number of device corresponding to the device indicated by the source device ID, the number may be an integer greater than or equal to 1. There is one destination device ID in FIG. 4 in a case that the number is 1; or there are multiple destination device IDs in FIG. 4 in a case that the number is more than 1. The destination device ID in FIG. 4 indicates device identification information corresponding to the device indicated by the source device ID, for example, the destination device ID may be identification information on the first MAC device in a case that the source device ID is the first identification information described above. In the embodiment, it is only required to send the identification information on the device to a connecting device in a case that the data packet is sent by the device, then the connecting device selects a next device configured to transmit the data packet based on the identification information and the routing table rule, and transmits the data packet to the next device.

Specifically, the first connecting device 22 may be configured to select the destination MAC device 231 described above from at least one MAC device included in the MAC array 23 based on the first identification information and the first routing table rule.

The second connecting device 24 is configured to send the data packet to the destination PHY device 251 based on the second identification information and a second routing table rule, where the destination PHY device 251 is assigned, in accordance with the second routing table rule, to receive the data packet, and the second routing table rule is preestablished for the user information.

The second routing table rule may have a same format as the first routing table rule described above, which is not described repeatedly here. The second connecting device 24 may select the destination PHY device 251 from at least one PHY device included in the PHY array 25 based on the second identification information and the second routing table rule when obtaining the second identification information.

The third connecting device 26 is configured to send the data packet to the destination RF device 271 based on the third identification information and a third routing table rule, where the destination RF device 271 is assigned, in accordance with the third routing table rule to receive the data packet, and the third routing table rule is preestablished for the user information.

The third routing table rule may have a same format as the first routing table rule described above, which is not described repeatedly here. The third connecting device 26 may select the destination RF device 271 from at least one RF device included in the RF array 27 based on the third routing table rule and the third identification information when obtaining the third identification information.

Figure 5:
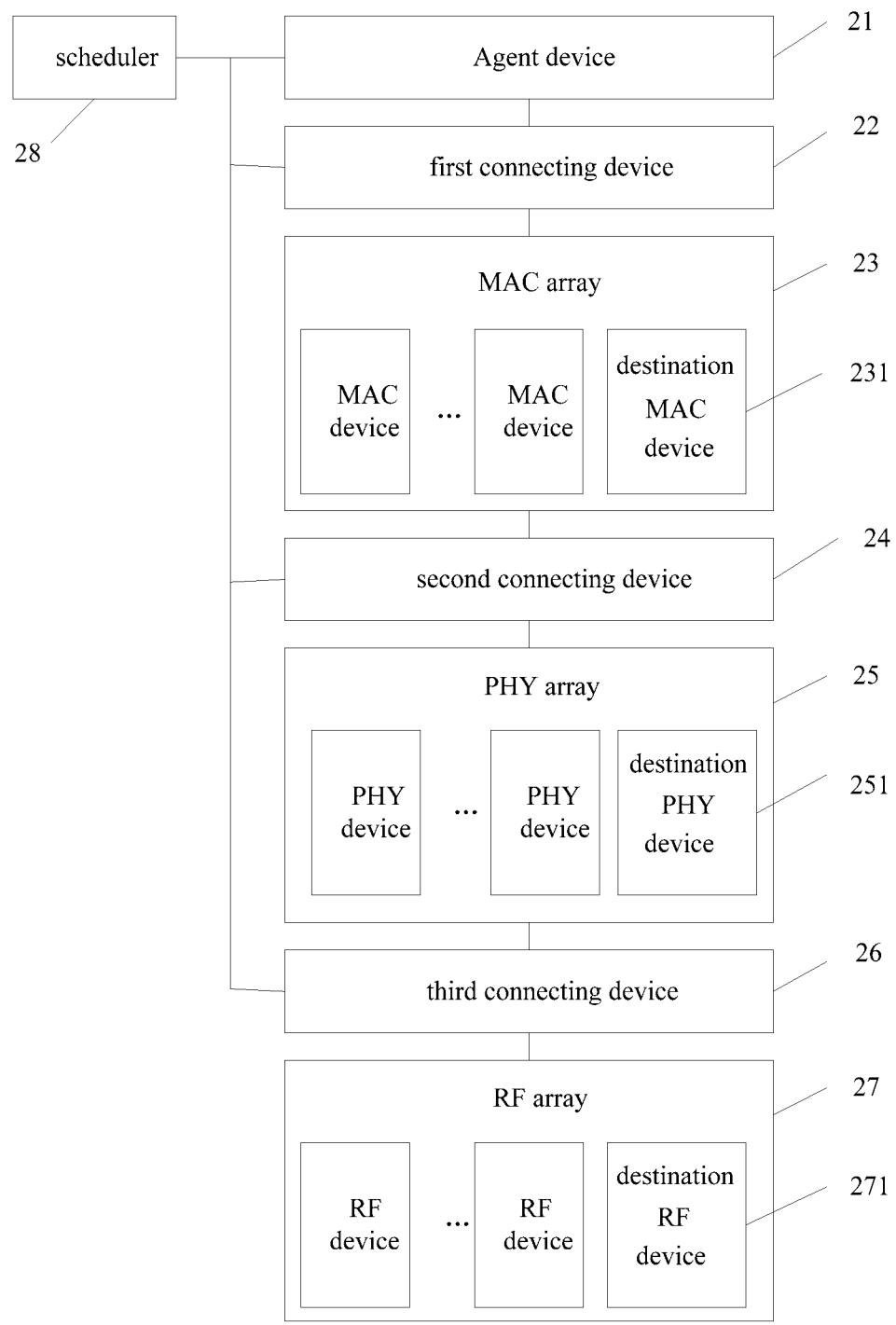
FIG. 5 is a schematic structural view of another data transmission system according to the embodiments of the present disclosure.

As an optional embodiment, the first routing table rule, the second routing table rule and the third routing table rule described above may all be established by the scheduler, as shown in FIG. 5, the system may further include a scheduler 28.

The scheduler 28 is configured to allocate transmission resources for the user information, generate the first routing table rule, the second routing table rule and the third routing table rule based on the transmission resources, and send the first routing table rule, the second routing table rule and the third routing table rule to the first connecting device, the second connecting device and the third connecting device, respectively.

The transmission resource is allocated to the user information described above, then, the allocated resource may be configured to transmit the data packet described above. The process of the allocation may be to select a transmission path for the data packet, that is, to select an MAC device in an MAC layer configured to transmit the data packet, a PHY device in a PHY layer configured to transmit the data packet and an RF device in an RF layer configured to transmit the data packet for an RF layer. That is, the destination MAC device 231 is selected from the MAC array 23, the destination PHY device 251 is selected from the PHY array 25, and the destination RF device 271 is selected from the RF array 27. In a case that the first connecting device 22, the second connecting device 24 and the third connecting device 26 receive the first routing table rule, the second routing table rule and the third routing table rule respectively, route forwarding tables of the first connecting device 22, the second connecting device 24 and the third connecting device 26 are updated. That is, the first routing table rule, the second routing table rule and the third routing table rule are updated to the route forwarding tables of the first connecting device 22, the second connecting device 24 and the third connecting device, respectively. Accordingly, the Agent device 21, the destination MAC device 231, the destination PHY device 251 and the destination RF device 271 are connected.

The Agent device 21 may further be configured to send the user information to the scheduler.

The user information may include source address information and destination address information. That is, the scheduler 28 allocates a path from the source address to the destination address.

Upon receiving user information, the scheduler 28 may further determine whether the user information exists in the scheduler 28. The transmission resource is allocated to the user information in a case that the user information exists in the scheduler 28. The user information is established in the scheduler in a case that the user information does not exist in the scheduler 28. Specifically, a table item may be created for the user information, and then the transmission resource is allocated to the user information.

A flow of allocating the transmission resource to the user information and generating the routing table rules described above by the scheduler 28 may be as shown in FIG. 6, the scheduler 28 may perform operations as follows.

In step 601, a scheduling algorithm is performed to calculate a type and the number of resource required for the user information.

The type and the number of the transmission resource required for the user information are calculated. Specifically, the scheduling algorithm is a well-known algorithm, which is not described in detail here.

In step 602, it is determined whether the transmission resource has been allocated to the user information based on the user information. Step 603 is performed in a case that the transmission resource has been allocated to the user information; step 604 is performed in a case that no transmission resource has been allocated to the user information.

The step of determining whether the transmission resource has been allocated to the user information may include: the scheduler 28 creates a list of the user information in a case that the transmission resource has been allocated to the user information, and the list is used to indicate transmission resource for transmitting the user information. That is, the scheduler 28 has allocated the transmission resource to the user information in a case that the scheduler 28 determines that the list described above includes the user information described above.

In step 603, it is determined whether the transmission resource allocated to the user information match with the calculated type and the number of the resource. The flow ends in a case that the transmission resource allocated to the user information match with the calculated type and the number of the resources; step 104 is performed in a case that the transmission resource allocated to the user information do not match with the calculated type and the number of the resourced.

In step 604, it is determined whether there is available transmission resource required for the user information. Step 605 is performed in a case that there is available transmission resource required for the user information. Step 604 is performed in a case that there is no available transmission resource required for the user information.

It is determined whether there is an available MAC device in the MAC array 23, an available PHY device in the PHY array 25 and an available RF device in the RF array 27. It is indicated that there is available transmission resource required for the user information, in a case that there is the available MAC device in the MAC array 23, the available PHY device in the PHY array 25 and the available RF device in the RF 27. The scheduler 28 waits in a case that there is no transmission resource required for the user information, and does not perform subsequent operation until there are the transmission resources required for the user information.

In step 605, a relation between the available transmission resource required for the user information and the user information is established. That is, the transmission resource is allocated for the user information according to the type and the number of the resource required for the user information.

The MAC device required for the user information is selected from the MAC array 23, the PHY device required for the user information is selected from the PHY array 25, and the RF device required for the user information is selected from the RF array 27. That is, the destination device 231 is selected from the MAC array, the destination PHY device 251 is selected from the PHY array 25, and the destination RF device 271 is selected from the RF array 27.

In step 606, the first routing table rule, the second routing table rule and the third routing table rule are generated based on the transmission resource allocated to the user information and then sent to the first connecting device, the second connecting device and the third connecting device respectively.

After the destination RF device 271 sends the data packet to the user side, the scheduler 28 may further terminate the relation between the transmission resource allocated to the user information and the user information, and send to the first connecting device 22, the second connecting device 24 and the third connecting device 26 to delete the first routing table rule, the second routing table rule and the third routing table rule, to terminate the relation between the transmission resource allocated to the data packet and the user information, recover the transmission resource allocated to the user information. That is, a relation between the Agent device 21, the destination MAC device 231, the destination PHY device 251 and the destination RF device 271.

The scheduler 28 may further update the transmission resource allocated to the user information, the user information is all user information to which the resources have been allocated, and may include user information in the data packet described above, or may not include the user information in the data packet described above, that is, it is determined in step 602 that no transmission resource is allocated to the user information described above. The updating the transmission resource allocated to the user information may be to determine whether the user information does not have a data packet transmission record for a long time, then recover resource allocated to the user information which does not have the data packet transmission record for a long time, that is, to terminate a relation between the transmission resource and the user information which does not have the data packet transmission record for a long time. The updating the transmission resource allocated to the user information may also be that the scheduler 28 updates the transmission resource allocated to the user information in a case that it is determined in step 604 that there is no available transmission resource required for the user information, thus the available transmission resource required for the user information are obtained. Of course, the scheduler 28 may also update the transmission resource allocated to the user information periodically.

As an optional embodiment, the first connecting device 22 may further be configured to select at least one destination MAC device 231 from the at least one MAC device based on the first routing table rule, and send the data packet to one destination MAC device 231 of the at least one destination MAC device 231.

The second connecting device 24 may further be configured to select at least one destination PHY device 251 from the at least one PHY device based on the second routing table rule, and send the data packet to one destination PHY device 251 of the at least one destination PHY device 251.

The third connecting device 26 may further be configured to select at least one destination RF device 271 from the at least one RF device based on the third routing table rule, and send the data packet to one destination RF device 271 of the at least one destination RF device 271.

Figure 7:
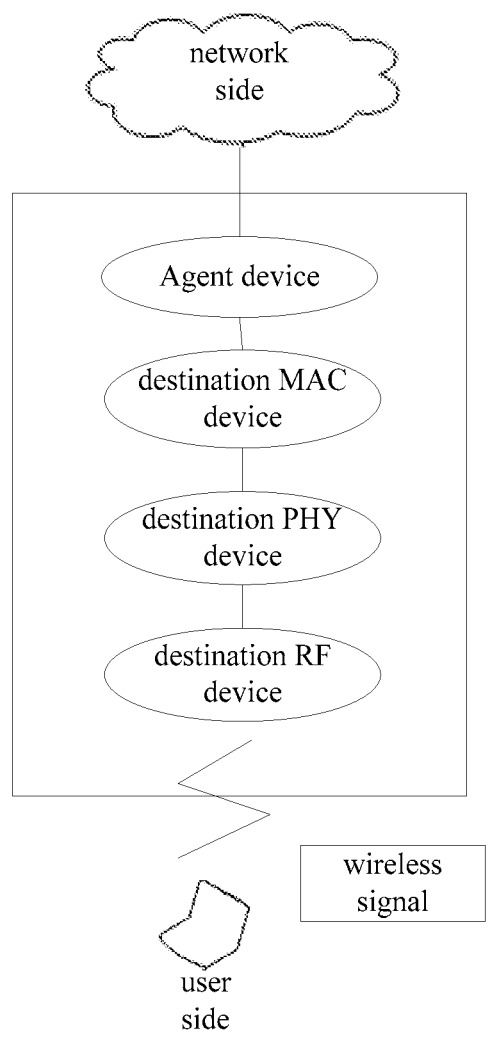
FIG. 7 to FIG. 11 are schematic views of optional paths according to the embodiments of the present disclosure.
Figure 8:
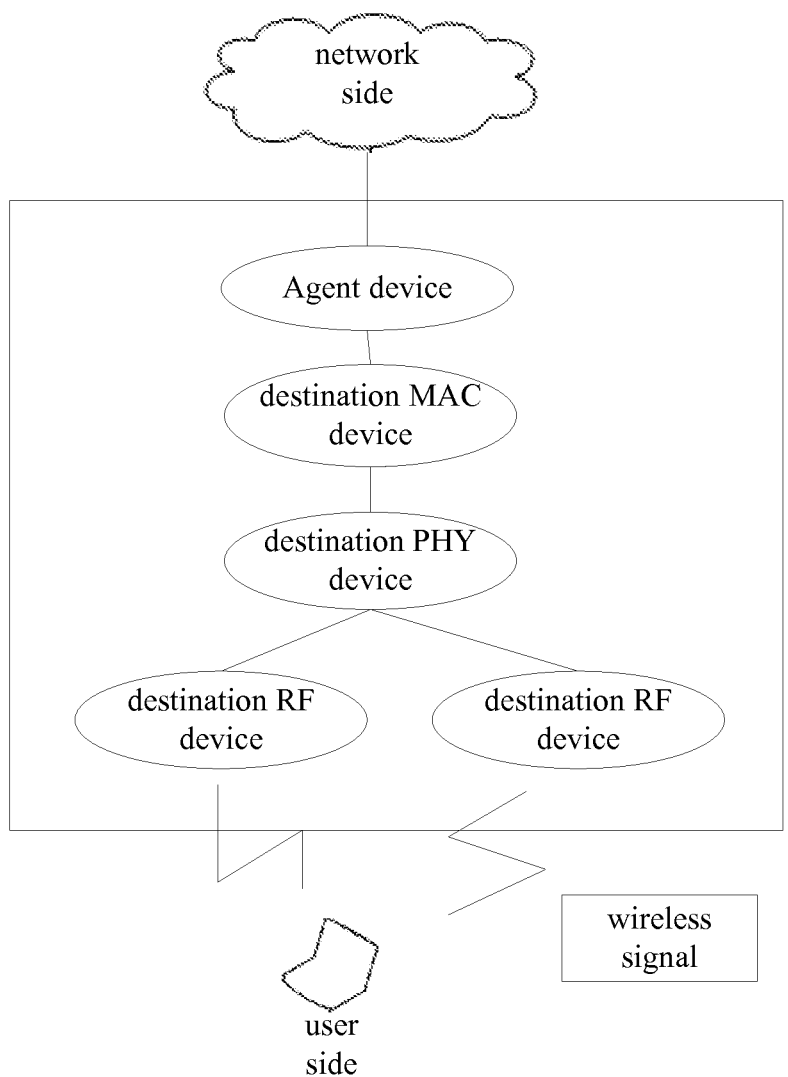
Figure 9:
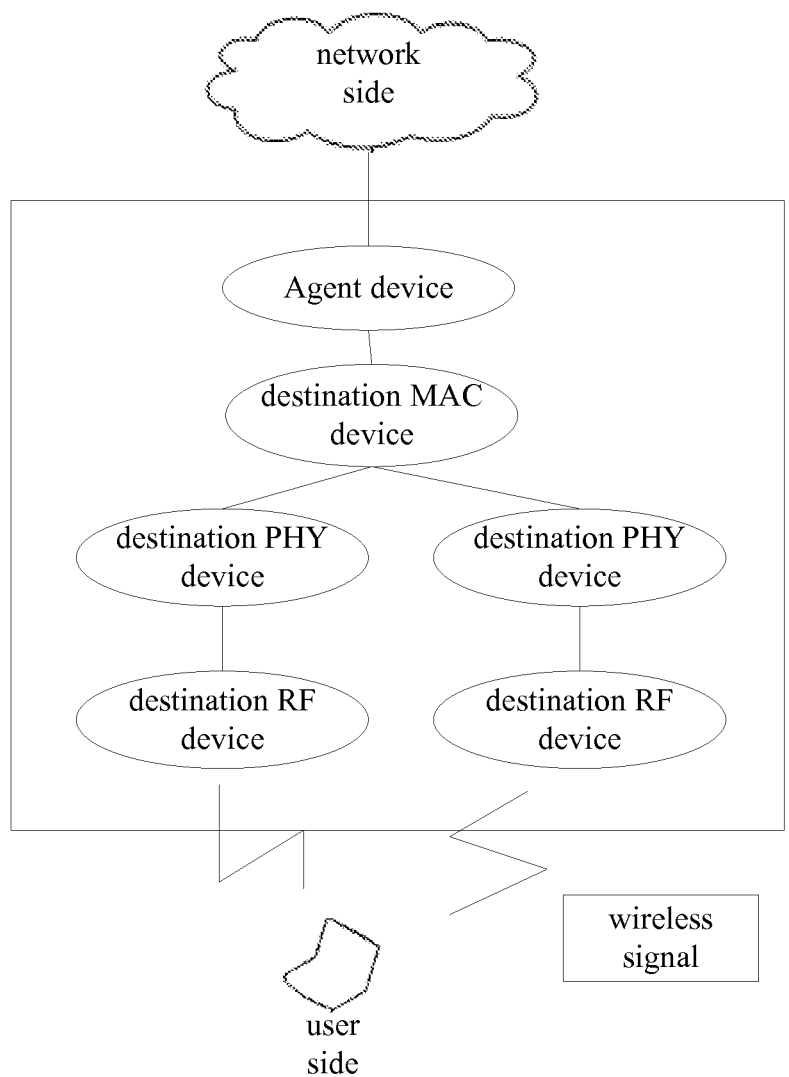
Figure 10:
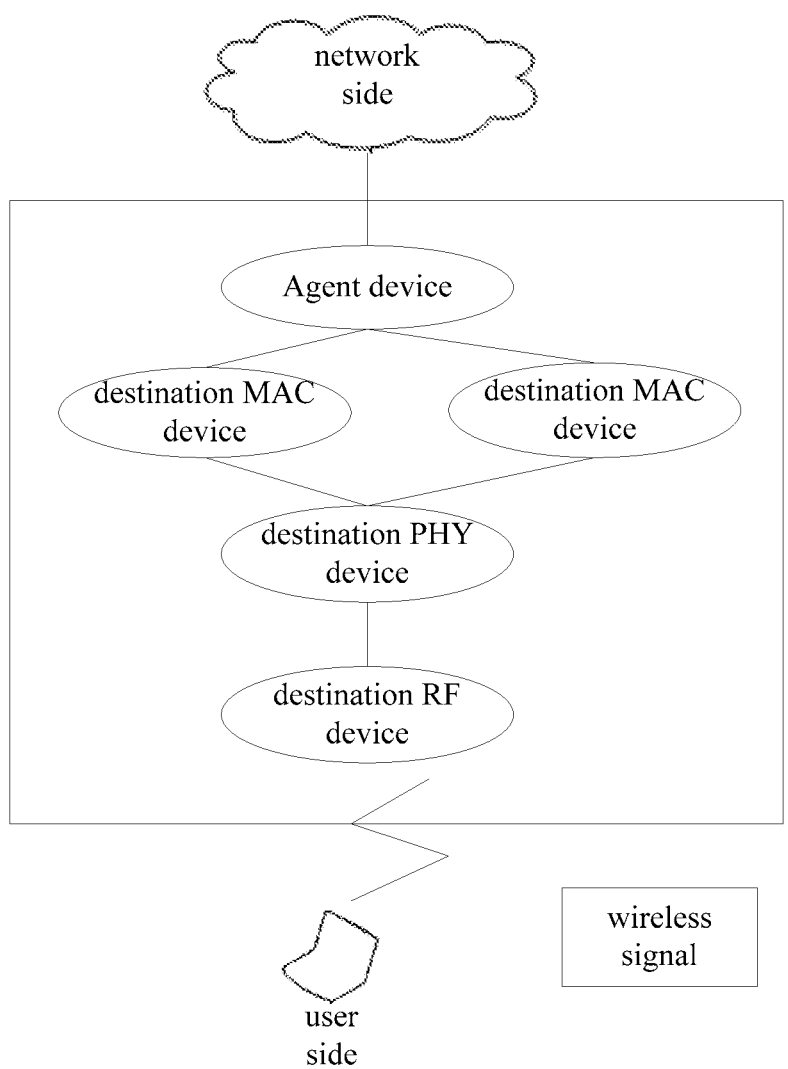
Figure 11:
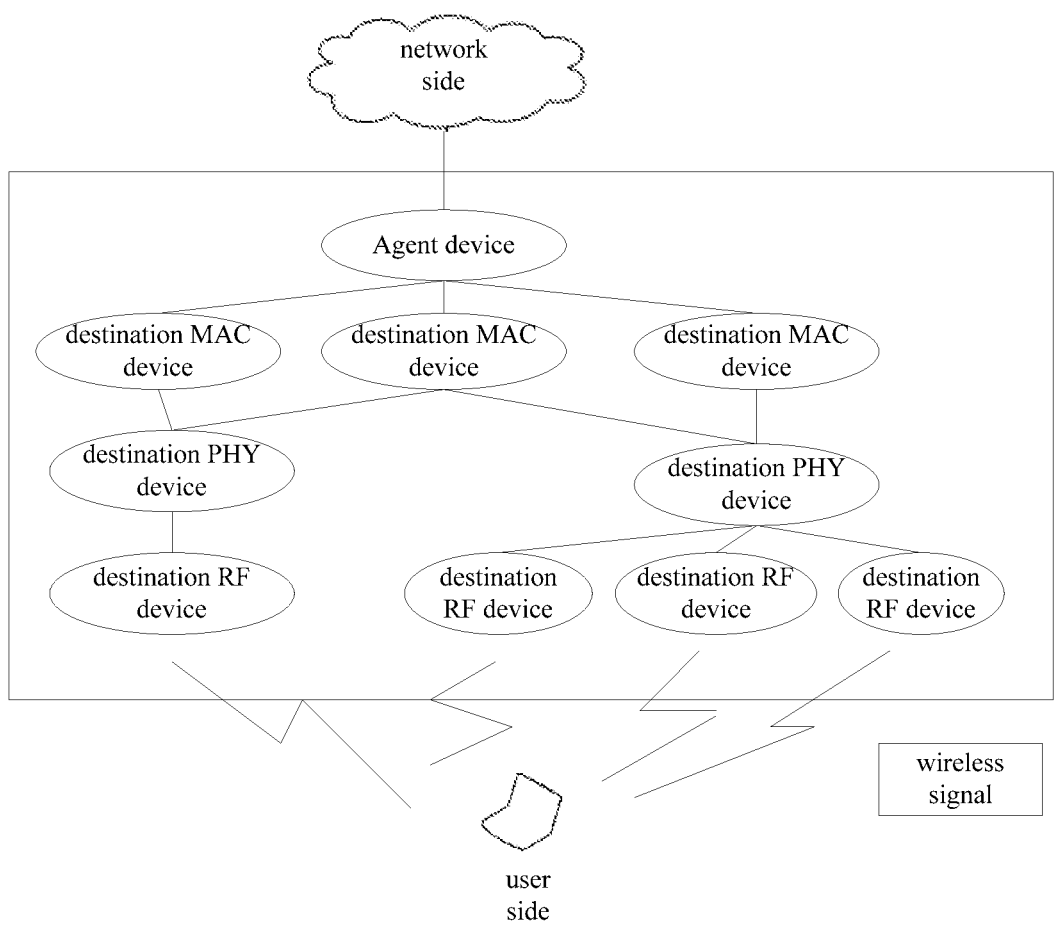

In the embodiment, there may be one or more destination MAC devices 231, the one or more destination PHY devices 251, and one or more destination RF devices 271. For example, a flow direction for the data packet may refer to as shown in FIG. 7 in a case that there is one destination MAC device 231, one destination PHY device 251 and one destination RF device 271. For example, joint processing for the RF layer may be realized in a case that there is one destination MAC device 231, one destination PHY device 251, and multiple destination RF devices 271, as shown in FIG. 8. For example, joint processing for the PHY layer and the RF layer may be realized in a case that there is one destination MAC device 231, multiple destination PHY devices 251, multiple destination RF devices 271, as shown in FIG. 9; For example, joint processing for the MAC layer may be realized in a case that there are multiple destination MAC devices 231, multiple destination PHY devices 251, and multiple destination RF devices 271, as shown in FIG. 10. And for example, joint processing for the MAC layer, the PHY layer and the RF layer may be realized in a case that there are multiple destination MAC devices 231, multiple destination PHY devices 251, and multiple destination RF devices 271, as shown in FIG. 11.

Figure 12:
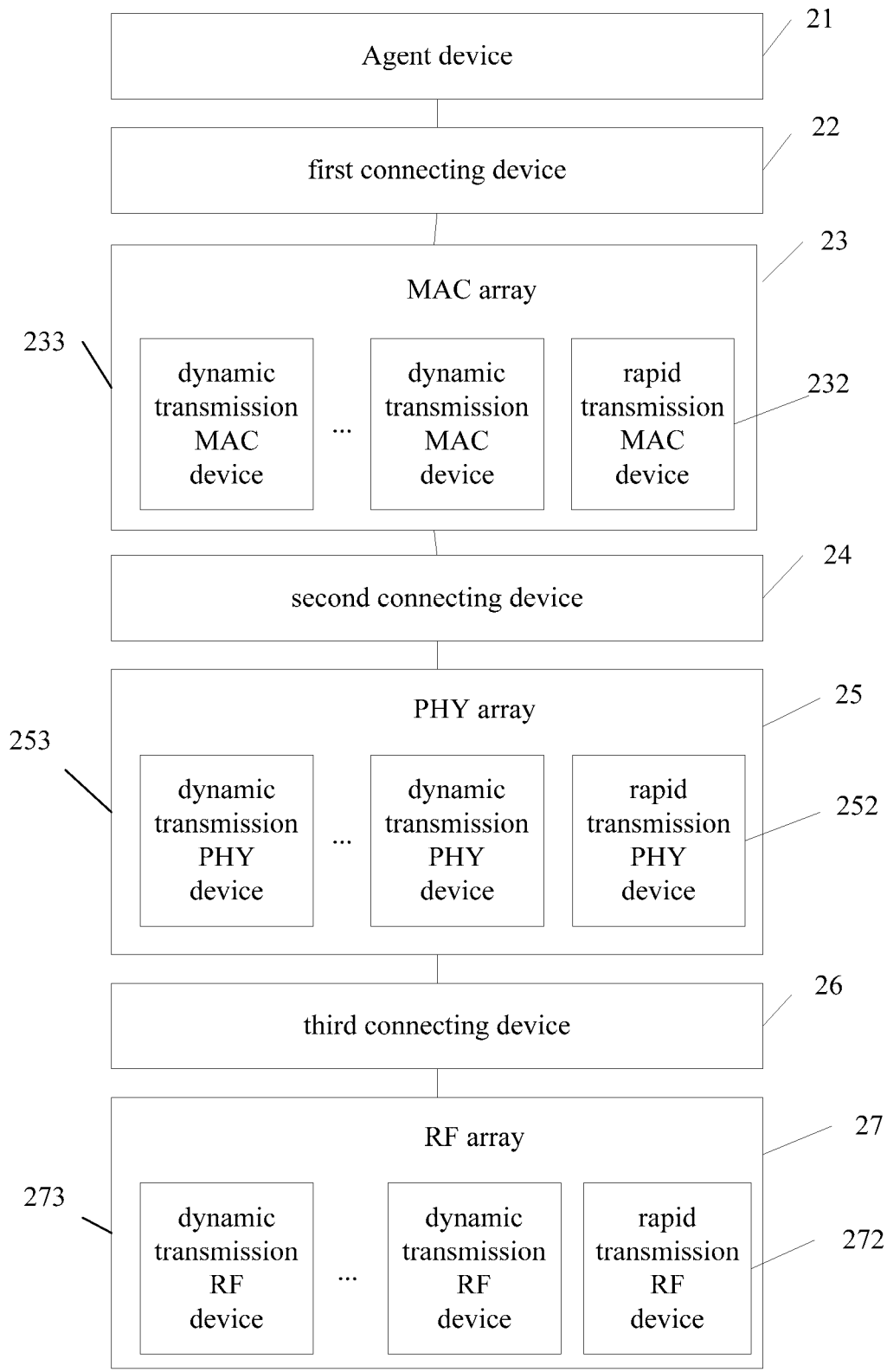
FIG. 12 is a schematic structural view of another data transmission system according to the embodiments of the present disclosure.

As an optional embodiment, as shown in FIG. 12, the MAC array 23 may also include at least one rapid transmission MAC device 232 and at least one dynamic transmission MAC device 233, the PHY array 25 may also include at least one rapid transmission PHY device 252 and at least one dynamic transmission PHY device 253, and the RF array 27 may also include at least one rapid transmission RF device 272 and at least one dynamic transmission RF device 273.

The first connecting device 22 may be further configured to transmit the data packet to the rapid transmission MAC device 232 based on the first identification information in a case that the data packet is an unowned data packet; or transmit the data packet to an MAC device assigned, in accordance with the first routing table rule, to receive the data packet in the dynamic transmission MAC device 233 based on the first identification information and the first routing table rule in a case that the data packet is an owned data packet. That is, the destination MAC device 231 is the rapid transmission MAC device 232 in a case that the data packet is a unowned data packet; or the destination MAC device 231 is an MAC device assigned, in accordance with the first routing table rule, to receive the data packet in the dynamic transmission MAC device 233 in a case that the data packet is an owned data packet.

The second connecting device 24 may be further configured to transmit the data packet to the rapid transmission PHY device 252 based on the second identification information in a case that the data packet is an unowned data packet; or transmit the data packet to a PHY device assigned, in accordance with the second routing table rule, to receive the data packet in the dynamic transmission PHY device 253 based on the second identification information and the second routing table rule in a case that the data packet is an owned data packet. That is, the destination PHY device 251 is the rapid transmission PHY device 252 in a case that the data packet is an unowned data packet; or the destination PHY device 251 is a PHY device assigned, in accordance with the second routing table rule, to receive the data packet in the dynamic transmission PHY device 253 in a case that the data packet is an owned data packet.

The third connecting device 26 may be further configured to transmit the data packet to the rapid transmission RF device 272 based on the third identification information in a case that the data packet is an unowned data packet; or transmit the data packet to an RF device assigned, in accordance with the third routing table rule, to receive the data packet in the dynamic transmission RF device 273 based on the third identification information and the third routing table rule in a case that the data packet is an owned data packet. That is, the destination RF device 271 is the rapid transmission RF device 272 in a case that the data packet is an unowned data packet; or the destination RF device 271 is an RF device assigned, in accordance with the third routing table rule, to receive the data packet in the dynamic transmission RF device 273 in a case that the data packet is an owned data packet.

Specifically, the unowned data packet refers to a data packet for which no routing table rule is established by the system, that is, a data packet of which user information having no routing table rule is the unowned data packet; and the owned data packet refers to a data packet for which a routing table rule is established by the system, that is, a data packet of which user information having a routing table rule is the owned data packet.

Two transmission paths are provided in the embodiment, a rapid transmission path for the data packet is provided in advance, which is a static path consisting of the Agent device 21, the first connecting device 22, the rapid transmission MAC device 232, the second connecting device 24, the rapid transmission PHY device 252, the third connecting device 26 and the rapid transmission RF device 272. In the embodiment, a dynamic transmission path for the data packet may further be provided, which is a dynamic path consisting of the Agent device 21, the first connecting device 22, the dynamic transmission MAC device 233, the second connecting device 24, the dynamic transmission PHY device 253, the third connecting device 26 and the dynamic transmission RF device 273.

In the technical solution described above, multiple optional embodiments are added on a basis of the above embodiments, which can all solve the problem of bottleneck performance in WiFi networking.

Figure 13:
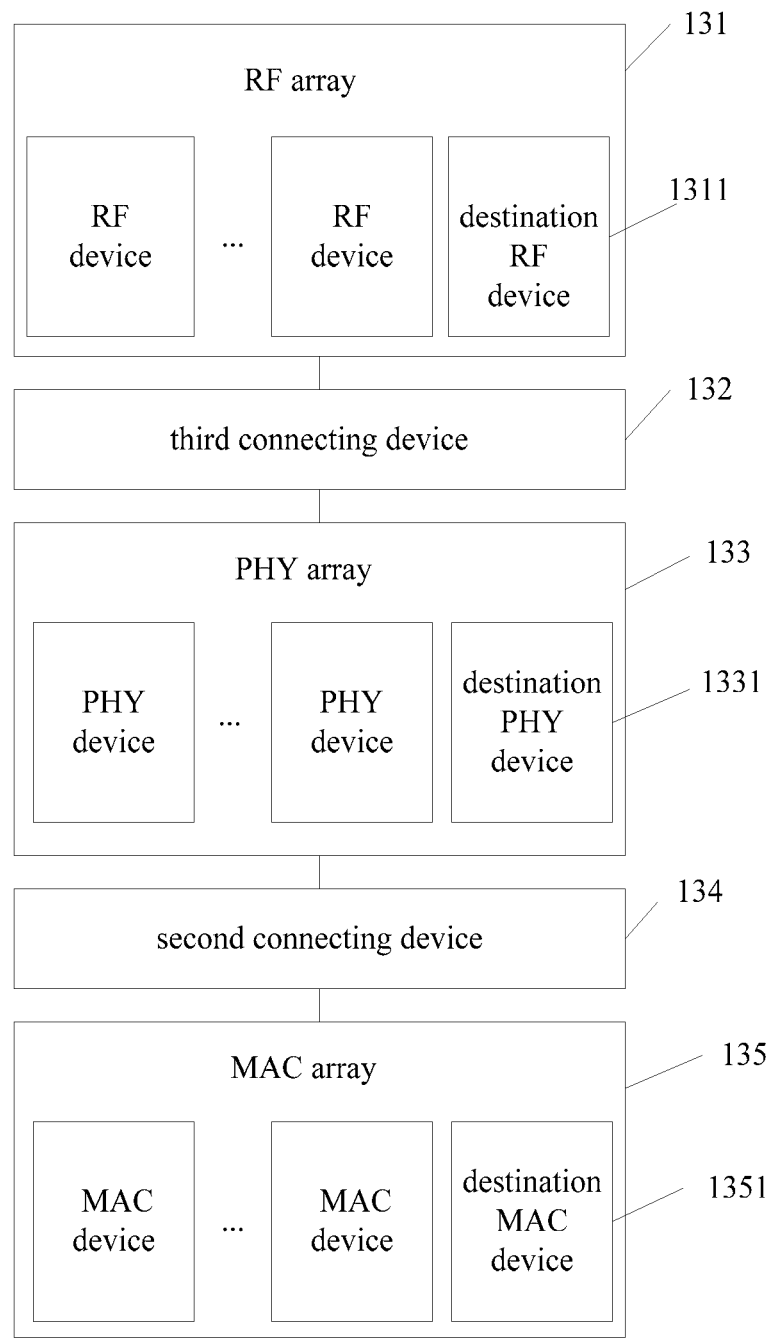
FIG. 13 is a schematic structural view of another data transmission system according to the embodiments of the present disclosure.

FIG. 13 is a schematic structural view of another data transmission system according to the embodiments of the present disclosure, as shown in FIG. 13, the data transmission system includes: an RF array 131 including at least one RF device, a third connecting device 132, a PHY array 133 including at least one PHY device, a second connecting device 134 and an MAC array 135 including at least one MAC device.

Specifically, a destination RF device 1311 is configured to send a first data frame to the third connecting device 132, where the first data frame includes a data packet and first identification information of the destination RF device 1311, and the destination RF device 1311 is included in the RF array 131.

The destination RF device 1311 may generate the first data frame including the first identification information and the data packet, where the first identification information may be a frame header of the data packet, and the frame header may further include direction information and payload (Payload) of the data packet. The direction information is used to indicate whether the data packet is transmitted from a network side to a user side or from the user side to the network side. The direction information in the embodiment of the present disclosure may be used to indicate that the data packet is transmitted from the user side to the network side. For example, an identifier "0" may indicate that the data packet is transmitted from the network side to the user side, and an identifier "1" may indicate that the data packet is transmitted from the user side to the network side. Specifically, a format of the frame header of the data frame in the embodiment may be a frame header as shown in FIG. 3.

The third connecting device 132 is configured to send the data packet to a destination PHY device 1331 in the PHY array 133 based on the first identification information.

The destination PHY device 1331 is configured to send a second data frame to the second connecting device 134, where the second data frame includes the data packet and second identification of the destination PHY device 1331.

The destination PHY device 1331 generates the second data frame including the second identification information and the data packet upon acquiring the data packet described above, and the data frame may have a same format as the first data frame. The first PHY device may further perform PHY layer operation on the data packet, such as, modulating, encoding, grouping and checking, and then generate the second data frame based on the data packet after the PHY layer operation and the second identification information.

The second connecting device 134 is configured to send the data to a destination MAC device 1351 in the MAC array 135 based on the second identification information.

The destination MAC device 1351 is configured to perform an MAC layer operation process on the data packet.

Specifically, the MAC layer operation process may include at least one of scanning, association, authentication and security.

In a case that the data packet on which the MAC layer operation process is required to be returned to the user side, the data packet may be returned in a path opposite to a path in the embodiment, that is, the data packet required is returned to the user side via the second connecting device 134, the destination PHY device 1331, the third connecting device 132 and the destination RF device 1311, which can refer to a flow starting from the destination MAC device described in the above embodiment.

In the technical solution described above, the destination RF device transmits the data packet to the destination PHY device via the third connecting device, then the destination PHY device transmits the data packet to the destination MAC device via the second connecting device, and the destination MAC device performs the MAC layer operation process on the data packet. In this way, a scheduling task for the data packet is realized by multiple devices, and therefore the problem of performance bottleneck in the WiFi networking can be solved.

Figure 14:
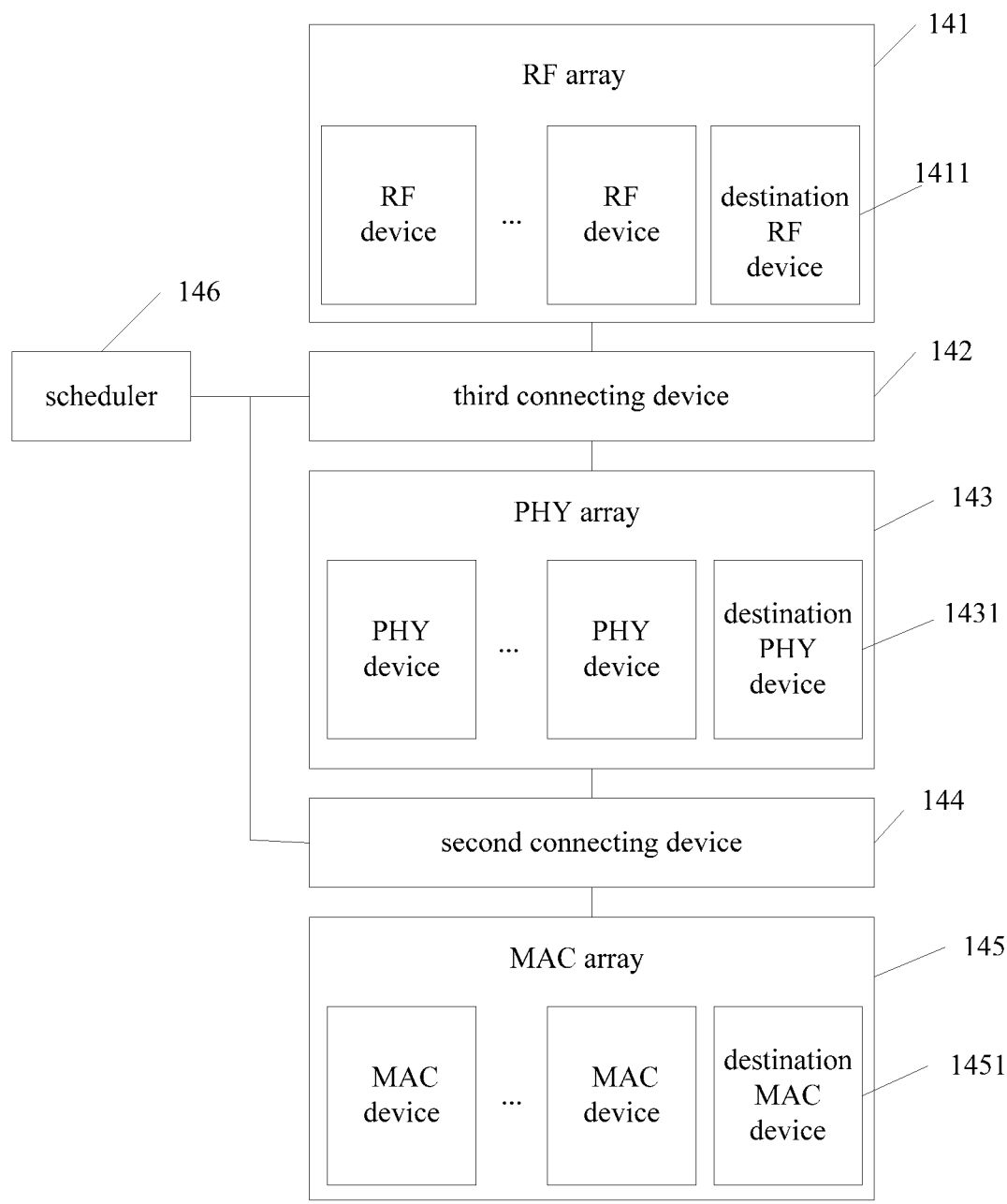
FIG. 14 is a schematic structural view of another data transmission system according to the embodiments of the present disclosure.

FIG. 14 is a schematic structural view of another data transmission system according to the embodiments of the present disclosure, as shown in FIG. 14, the data transmission system includes: an RF array 141 including at least one RF device, a third connecting device 142, a PHY array 143 including at least one PHY device, a second connecting device 144 and an MAC array 145 including at least one MAC device.

Specifically, a destination RF device 1411 is configured to send a first data frame to the third connecting device 142, where the first data frame includes a data packet and first identification information of the destination RF device 1411, and the destination RF device 1411 is the included in the RF array 141.

The destination RF device 1411 may further perform RF layer operation on the data packet, such as, a digital-to-analogue conversion, an analogue-to-digital conversion, sampling and filtering, and then generate the data frame including a data packet after the RF layer operation and the first identification information.

The third connecting device 142 is configured to send the data packet to a destination PHY device 1431 in the PHY array 143 based on the first identification information, and the destination PHY device 1431 is included in the at least PHY device.

The third connecting device 142 may parse the first data frame upon acquiring the data frame, to obtain the first identification information. Then, the third connecting device 142 may know which device sends the first data frame. The third connecting device 142 selects the destination PHY device 1431 from the at least one PHY device included in the PHY array 143 based on the first identification information. Specifically, a way of selecting the destination PHY device 1431 may be to select a PHY device, included in the PHY array 143, preassigned to perform rapid transmission as the destination PHY device 1431; or to select an PHY device assigned, in accordance with a third routing table rule, to receive the data packet from at least one PHY device included in the PHY array 143 as the destination PHY device 1431 based on a third routing table rule.

The destination PHY device 1431 is configured to send the second data frame to the second connecting device 144, and the second data frame includes the data packet and second identification information of the destination PHY device 1431.

The destination PHY device 1431 generates the second data frame including the second identification information and the data packet upon acquiring the data packet, and the data frame may have a same format as the first data frame. The destination PHY device 1431 may further perform PHY layer operation on the data packet, such as, modulating, encoding, grouping and checking, and generate the second data frame based on a data packet after the PHY layer operation and the second identification information. A format of the frame header of the second data frame may be a format as shown in FIG. 3.

The second connecting device 144 is configured to send the data packet to a destination MAC device 1451 in the MAC array 145 based on the second identification information, and the destination MAC device 1451 is included in the at least one MAC device.

The second connecting device 144 may parse the data frame upon acquiring the first data frame, to obtain the first identification information. Then, the second connecting device 144 may know which device sends the first data frame. The second connecting device 144 selects the destination MAC device 1451 from at least one MAC device included in the MAC array 145 based on the first identification information. A way of selecting the destination MAC device may be to select an MAC device, included in the MAC array 145, preassigned to perform rapid transmission as the destination MAC device 1451; or to select an MAC device assigned, in accordance with a second routing table rule, to receive the data packet from at least one MAC device included in the MAC array 145 as the destination MAC device 1451 based on the second routing table rule.

The destination MAC device 1451 is configured to perform an MAC layer operation process on the data packet. The MAC layer operation process may include at least one of scanning, association, authentication and security.

As an optional embodiment, the third connecting device 142 may be further configured to send the data packet to the destination PHY device 1431 based on the first identification information, where the destination PHY device 1431 is preassigned to perform rapid transmission.

The second connecting device 144 may further be configured to send the data packet to the destination MAC device 1451 based on the second identification information, the destination MAC device 1451 is preassigned to perform rapid transmission. In the embodiment, an unowned data packet may be transmitted, that is, the data packet in the embodiment may be the unowned data packet.

The data packet may further include the user information; the system may further include a scheduler 146.

The scheduler 146 may be further configured to allocate transmission resource to the user information, generate the third routing table rule and the second routing table rule based on the transmission resource, and send the third routing table rule and the second routing table rule to the third connecting device 142 and the second connecting device 144, respectively. Accordingly, in a case that an owned data packet including the user information is transmitted next time, the third connecting device 142 and the second connecting device 144 may select the destination PHY device 1431 and the destination MAC device 1451 based on the third routing table rule and the second routing table rule, which can refer an embodiment below.

As an optional embodiment, the data packet includes the user information, and the system has a routing table rule established for the user information, that is, the data packet is an owned data packet.

The third connecting device 142 may further be configured to send the data packet to the destination PHY device 1431 based on the first identification information and the third routing table rule, and the destination PHY device 1431 is assigned, in accordance with the routing table rule, to receive the data packet, and the first routing table rule is preestablished for the user information.

The second connecting device 144 may further be configured to send the data packet to the destination MAC device 1451 based on the second identification information and a second routing table rule, and the destination MAC device 1451 is assigned, in accordance with the second routing table rule, to receive the data packet, and the second routing table rule is preestablished for the user information.

Figure 15:
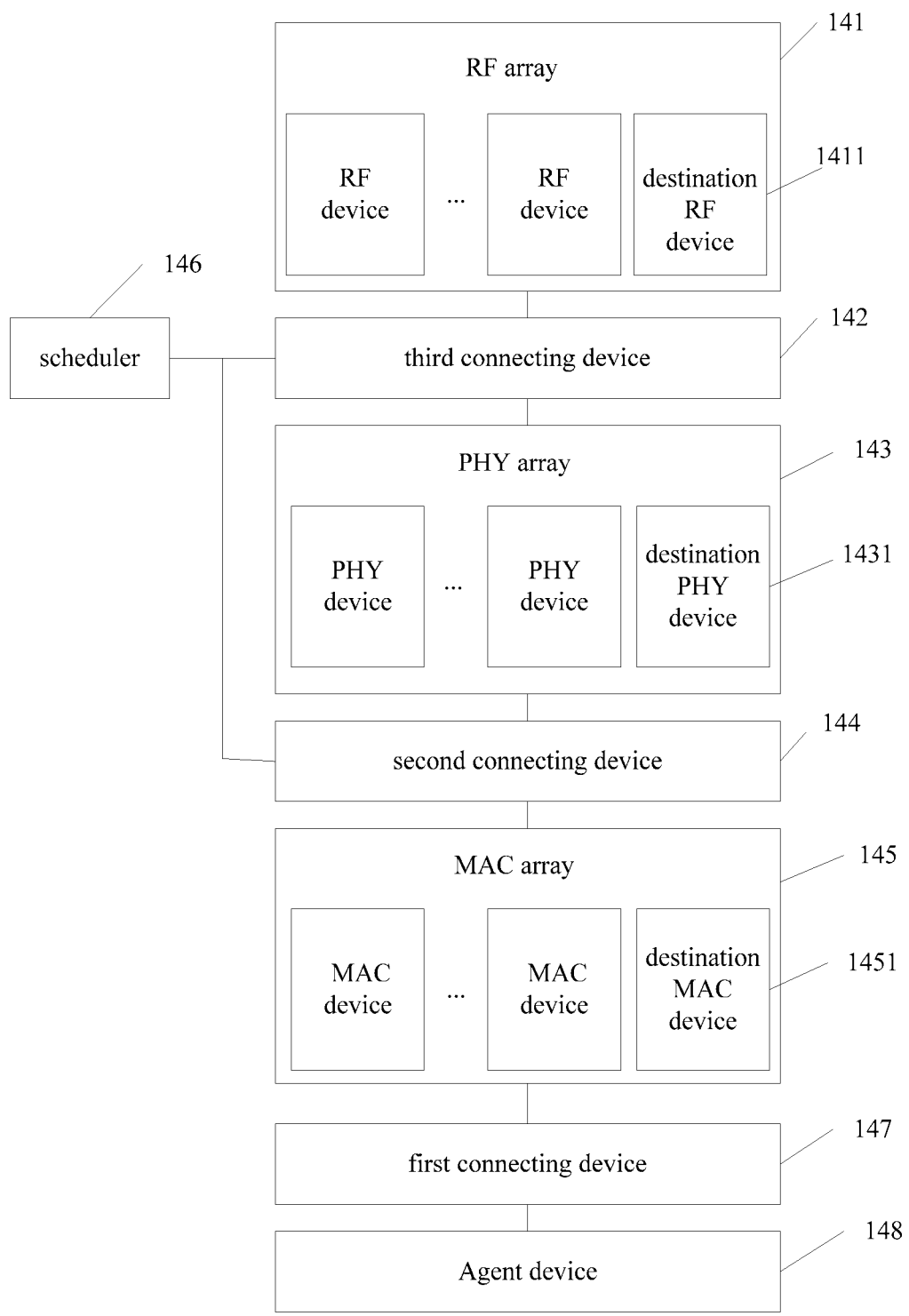
FIG. 15 is a schematic structural view of another data transmission system according to the embodiments of the present disclosure.

As an optional embodiment, as shown in FIG. 15, the system may further include a first connecting device 147 and an Agent device 148.

Specifically, the destination MAC device 1451 may be further configured to send a third data frame to the first connecting device 147 in a case that the data packet is sent to a network side, and the third data frame includes the data packet and third identification information on the destination MAC device.

The first connecting device 147 is configured to send the data packet to the Agent device 148 based on the third identification information.

The Agent device 148 is configured to send the data packet to the network side.

The destination MAC device 1451 may determine whether the data packet is to be sent to the network side. For example, the destination MAC device 1451 determines that the data packet is sent to the network side in a case of determining that the data packet is an association registration request. For example, the destination MAC device 1451 may further determine whether the data packet is sent to the network side based on the user information included in the data packet. For example, it is determined that the data packet is sent to the network side in a case that destination address information included in the user information is network side address information. Of course, it is also determined by other method whether the data packet is sent to the network side, which is not described here.

As an optional embodiment, the first connecting device 147 may further be configured to send the data packet to the Agent device 148 based on the third identification and a third routing table rule. The Agent device 148 is assigned, in accordance with the third routing table rule, to receive the data packet, and the third routing table rule is preestablished for the user information. The third routing table rule may be established by the scheduler 146 for the user information.

The destination MAC device 1451 may further be configured to send the user information to the scheduler 146.

The scheduler 146 may further be configured to allocate transmission resource to the user information, generate a first routing table rule based on the transmission resource, and send the first routing table rule to the first connecting device 147.

Figure 16:
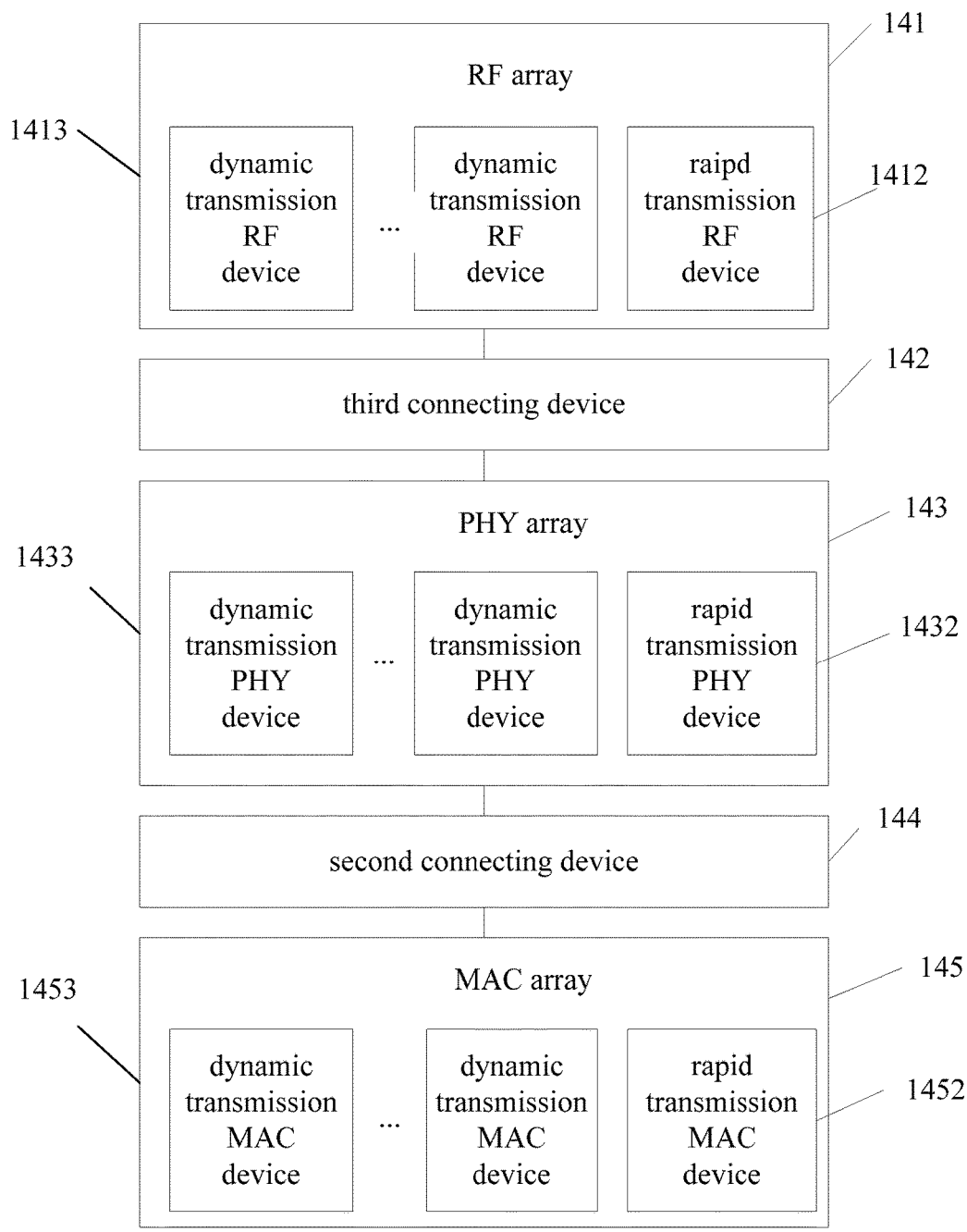
FIG. 16 is a schematic structural view of another data transmission system according to the embodiments of the present disclosure.

As an optional embodiment, as shown in FIG. 16, the MAC array 145 may further include at least one rapid transmission MAC device 1452 and at least one dynamic transmission MAC device 1453, the PHY array 143 may further include at least one rapid transmission PHY device 1432 and at least one dynamic transmission PHY device 1433, and the RF array 141 may further include at least one rapid transmission RF device 1412 and at least one dynamic transmission RF device 1413.

The third connecting device 142 may further be configured to transmit the data packet to the rapid transmission PHY device 1432 based on the first identification information in a case that the data packet is an unowned data packet; or transmit the data packet to a PHY device assigned, in accordance with the first routing table rule, to receive the data packet in the dynamic transmission PHY device 1433 based on the first identification information and the first routing table rule in a case that the data packet is an owned data packet. That is, the destination PHY device 1431 is the rapid transmission PHY device 1432 in a case that the data packet is an unowned data packet; and the destination PHY device 1431 is assigned, in accordance with the first routing table rule, to receive the data packet in the dynamic transmission PHY device 1433 in a case that the data packet is an owned data packet.

The second connecting device 144 may be further configured to transmit the data packet to the rapid transmission MAC device 1452 based on the second identification information in a case that the data packet is an unowned data packet; or transmit the data packet to an MAC device assigned, in accordance with the second routing table rule, to receive the data packet in the dynamic transmission MAC device 1453 based on the second identification information and the second routing table rule in a case that the data packet is an owned data packet. That is, the destination MAC device 1451 is the rapid transmission MAC device 1452 in a case that the data packet is an unowned data packet; or the destination MAC device 1451 is assigned, in accordance with the second routing table rule, to receive the data packet in the dynamic transmission MAC device 1453 in a case that the data packet is an owned data packet.

Specifically, the unowned data packet refers to a data packet for which no routing table rule is established by the system, that is, a data packet including the user information having no routing table rule is an unowned data packet; and the owned data packet refers to a data packet for which a routing table rule is established by the system, that is, the data packet including the user information having a routing table rule is an owned data packet.

Two transmission paths are provided in the embodiment, that is, a rapid transmission for the data packet is provided in advance, which is a static path consisting of the destination RF device 1411, the third connecting device 142, the rapid transmission RF device 1432, the second connecting device 144, the rapid transmission MAC device 1442, the first connecting device 147 and the Agent device 148. In the embodiment, a dynamic transmission path for the data packet may further be provided, which is a dynamic path consisting of the target RF device 1411, the third connecting device 142, the dynamic transmission RF device 1433, the second connecting device 144, the dynamic transmission, the MAC device 1443, the first connecting device 147 and the Agent device 148.

In the technical solution described above, multiple optional embodiments are added on a basis of the above embodiments, which can all solve the problem of performance bottleneck in WiFi networking.

Figure 17:
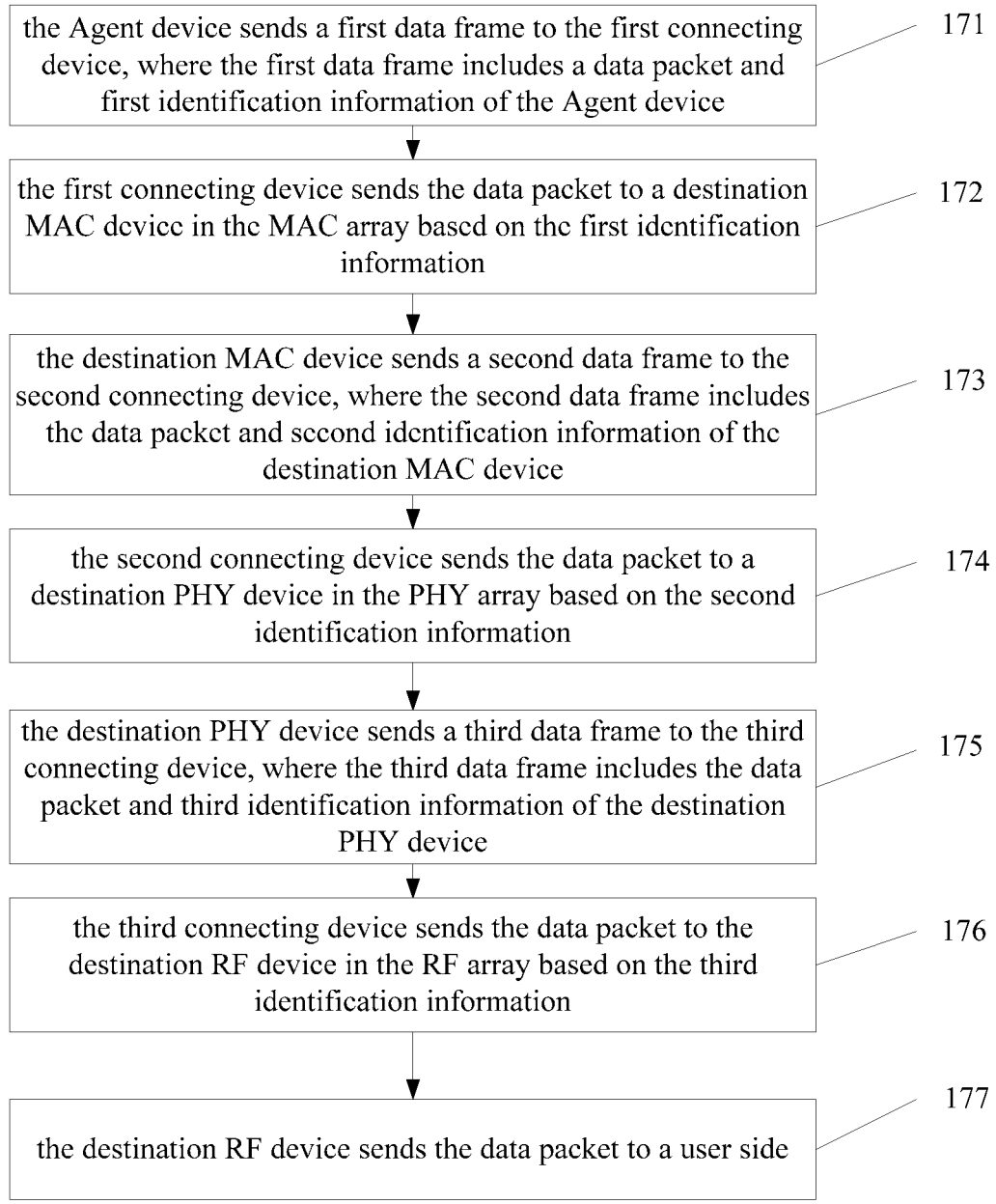
FIG. 17 is a schematic flowchart of a data transmission method according to the embodiments of the present disclosure.

FIG. 17 is a schematic flowchart of a data transmission method according to the embodiments of the present disclosure, the data transmission method is applied to a data transmission system, the system includes: an Agent device, a first connecting device, an MAC array including at least one MAC device, a second connecting device, a PHY array including at least one PHY device, a third connecting device and an RF array including at least one RF device, as shown in FIG. 17, and the method includes steps 171 to 177.

In step 171, the Agent device 11 sends a first data frame to the first connecting device, where the first data frame includes a data packet and first identification information of the Agent device.

In step 171, the Agent device may generate the first data frame including the data packet and the first identification information. The first identification information may be a frame header of the data frame, and the frame header may further include direction information and a payload (Payload) of the data packet. The direction information is used to indicate whether the data packet is transmitted from a network side to a user side or transmitted from the user side to the network side, the direction information in the embodiments of the present disclosure may be used to indicate that the data packet is transmitted from the network side to the user side. For example, an identifier "0" may indicate the data packet is transmitted from the network side to the user side, and an identifier "1" may indicate the data packet is transmitted from the user side to the network side.

In step 172, the first connecting device sends the data packet to a destination MAC device in the MAC array based on the first identification information.

In step 173, the destination MAC device sends a second data frame to the second connecting device, where the second data frame includes the data packet and second identification information of the destination MAC device.

The destination MAC device generates the second data frame including second identification information and the data packet upon acquiring the data packet, and the data frame may have a same format as the first data frame. The destination MAC device may further perform MAC layer operation on the data packet, such as, scanning, association, authentication and security, and generate the second data frame based on a data packet after the MAC layer operation and the second identification information. The destination PHY device may be one or more PHY device of the at least one PHY device.

In step 174, the second connecting device sends the data packet to a destination PHY device in the PHY array based on the second identification information.

In step 175, the destination PHY device sends a third data frame to the third connecting device, where the third data frame includes the data packet and third identification information of the destination PHY device.

The destination PHY device generates the third data frame including third identification information and the data packet upon acquiring the data packet, the data frame may have a same format as the first data frame. The destination PHY device may further perform PHY layer operation on the data packet, such as, modulating, encoding, grouping and checking, and generate the third data frame based on a data packet after the PHY layer operation and the third identification information. The destination RF device may be one or more RF device of the at least one PHY device.

In step 176, the third connecting device sends the data packet to the destination RF device in the RF array based on the third identification information.

In step 177, the destination RF device sends the data packet to a user side.

The destination RF device may further perform an RF layer operation on the data packet, such as, a digital-to-analogue conversion, an analogue-to-digital conversion, sampling and filtering, and send the data packet after the RF layer operation to the user side.

In the technical solution described above, the Agent device transmits the data packet to the first MAC device via the first connecting device, the destination MAC device transmits the data packet to the destination PHY device via the second connecting device, the destination PHY device transmits the data packet to the destination RF device via the third connecting device, and the destination RF device transmits the data packet to the user side. In this way, a scheduling task for the data packet is realized by multiple devices, and therefore the problem of performance bottleneck in the WiFi networking can be solved.

Figure 18:
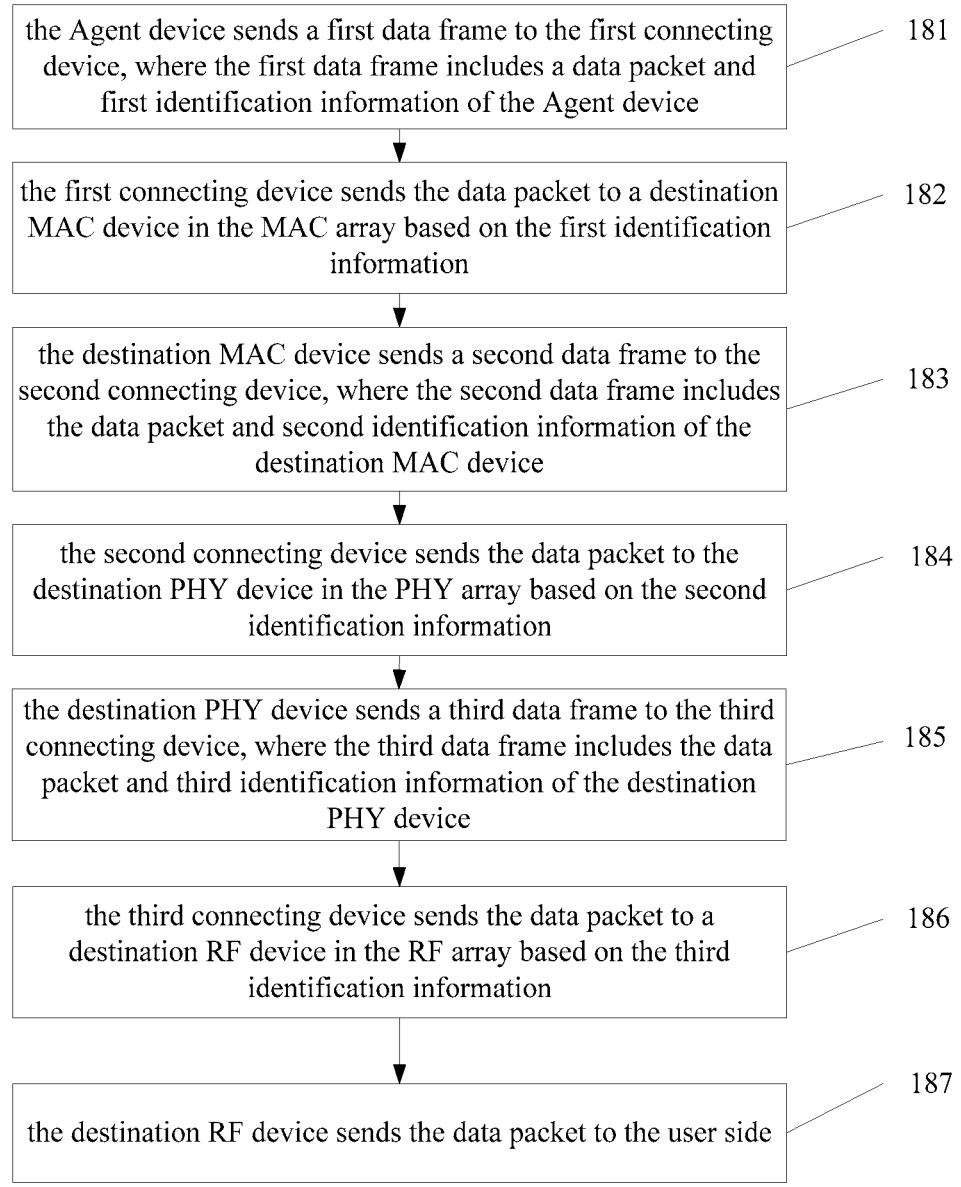
FIG. 18 is a schematic flowchart of another data transmission method according to the embodiments of the present disclosure.

FIG. 18 is a schematic flowchart of a data transmission method according to the embodiments of the present disclosure, the data transmission method is applied to a data transmission system, the system includes: an Agent device, a first connecting device, an MAC array including at least one MAC device, a second connecting device, a PHY array including at least one PHY device, a third connecting device and an RF array including at least one RF device, as shown in FIG. 18, and the method includes steps 181 to 187.

In step 181, the Agent device sends a first data frame to the first connecting device, where the first data frame includes a data packet and first identification information of the Agent device.

The Agent device may generate the first data frame including the data packet and the first identification information. The first identification information may be a frame header of the data frame, and the frame header may further include direction information and a payload (Payload) of the data packet. The direction information is used to indicate whether the data packet is transmitted from a network side to a user side or transmitted from the user side to the network side. The direction information in the embodiment of the present disclosure may indicate that the data packet is transmitted from the network side to the user side. For example, an identifier "0" may indicate that the data packet is transmitted from the network side to the user side, and an identifier "1" may indicate that the data packet is transmitted from the user side to the network side. A format of a frame header of the first data frame may be as shown in FIG. 3, in FIG. 3, "direction" is used to indicate the direction information on the data packet, "source device ID" is used to indicate identification information on sending the data packet, such as, the first identification information.

The data packet described above may also be an IP data packet, the Agent device may further parse the data packet to obtain the user information. That is, the Agent device may perform IP layer operation on the data packet. The user information may include source address information and destination address information on the data packet. The Agent device transmits the parsed data packet to a buffer device (not shown) via a buffer interface after parsing the IP data packet, and further obtains the buffered data packet from the buffer device (not shown in the drawings), and generates the first data frame including the obtained data packet and the first identification information. The system may further include the buffer device (not shown in the drawings).

The data packet described above may further be a data packet sent from the network side to the Agent device.

In step 182, the first connecting device sends the data packet to a destination MAC device in the MAC array based on the first identification information.

The first connecting device may parse the first data packet upon acquiring the data frame, to obtain the first identification information, so that the first connecting device can know which device sends the first data frame. The first connecting device selects the destination MAC device from at least one MAC device included in the MAC array based on the first identification information. Specifically, a way of selecting the destination MAC device 231 may be to select an MAC device, included in the MAC array, preassigned to perform rapid transmission as the destination MAC device; or to select an MAC device assigned, in accordance with a first routing table rule, to receive the data packet from at least one MAC device included in the MAC array as the destination MAC device based on the first routing table rule.

In step 183, the destination MAC device sends a second data frame to the second connecting device, where the second data frame includes the data packet and second identification information of the destination MAC device.

Specifically, a format of the second data frame may be the same as a format of the first data frame, which is not described repeatedly here. The destination MAC device may further perform MAC layer operation on the data packet, and send the data packet after the MAC layer operation and the second identification information to the second connecting device.

In step 184, the second connecting device sends the data packet to the destination PHY device in the PHY array based on the second identification information.

The second connecting device may parse the second data frame upon acquiring the data frame, to obtain the second identification information, so that the second connecting device can know which device sends the second data frame. The second connecting device selects the destination PHY device from at least one PHY device included in the PHY array based on the second identification information. Specifically, a way of selecting the destination PHY device may be to select a PHY device, included in the PHY array, preassigned to perform rapid transmission as the destination PHY device; or to select a PHY device assigned, in accordance with a second routing table rule, to receive the data packet from at least one PHY device included in the PHY array as the destination PHY device based on the second routing table rule.

In step 185, the destination PHY device sends a third data frame to the third connecting device, where the third data frame includes the data packet and third identification information of the destination PHY device.

Specifically, the third data frame may have a same as the first data frame, which is not described repeatedly here. The destination PHY device may further perform PHY layer operation on the data packet, and send the data packet on which the PHY layer operation is already performed and the third identification information to the third connecting device.

In step 186, the third connecting device sends the data packet to a destination RF device in the RF array based on the third identification information.

The third connecting device may parse the third data packet upon acquiring the data frame, to obtain the third identification information, so that the third connecting device can know which device sends the third data frame. The third connecting device selects the destination RF device from at least one RF device included in the RF array based on the third identification information. Specifically, a way of selecting the destination RF device may be to select a RF device, included in the RF array, preassigned to perform rapid transmission as the destination RF device; or to select an RF device assigned, in accordance with the second routing table rule, to receive the data packet from at least one RF device included in the RF array as the destination RF device based on the second routing table rule.

In step 187, the destination RF device sends the data packet to the user side.

The destination RF device may further perform RF layer operation on the data packet, such as, a digital-to-analogue conversion, an analogue-to-digital conversion, sampling and filtering, and send the data packet after the RF layer operation to the user side.

As an optional embodiment, step 182 may further include: the first connecting device sends the first dada frame to the destination MAC device based on the first identification information, where the destination MAC device is preassigned to perform rapid transmission. The MAC array may include the rapid transmission MAC device, of course, the MAC array may include other MAC device in addition to the rapid transmission MAC device. The destination MAC device may generate the second data frame upon receiving the data packet, and send the second data frame to the second connecting device.

Step 184 may further include: the second connecting device sends the data packet to the destination PHY based on the second identification information, and the destination PHY device is preassigned to perform rapid transmission. That is, the PHY array may include the rapid transmission PHY, of course, or the PHY array may include other PHY device. The destination PHY device may generate the third data frame upon receiving the data packet, and send the third data frame to the third connecting device.

Step 186 may further include: the third connecting device sends the data packet to the destination RF device based on the third identification information, and the destination RF device is preassigned to perform rapid transmission. That is, the RF array may include the rapid transmission RF device, of course, or the RF array may further include other RF device.

In the embodiment, the data packet may be transmitted to the user side by rapid transmission, that is, the first connecting device, the second connecting device and the third connecting device do not route the data packet. In the embodiment, an unowned data packet may also be transmitted, that is, the data packet described above is an unowned data packet, no routing table rule is established for the user information in the system. That is, the data packet including the user information having no the routing table rule is an unowned data packet. Of course, in the embodiment, rapid transmission may further be performed on the data packet including the user information having the routing table rule.

As an optional embodiment, the data packet includes user information, and the system has a routing table rule established for the user information.

Step 182 may further include: the first connecting device sends the data packet to the destination MAC device based on the first identification information and a first routing table rule, and the destination MAC device is assigned, in accordance with the first routing table rule, to receive the data packet, and the first routing table rule is preestablished for the user information.

The first routing table rule may be as shown in FIG. 4, specifically, "source device ID" in FIG. 4 is used to indicate identification information of a device configured to send the data frame. For example, the first data frame is sent by the Agent device, that is, the source device ID in the first routing table rule may also be the first identification information. "Number" in FIG. 4 is used to indicate the number of device corresponding to the device indicated by the source device ID. The number may be an integer greater than or equal to one. There is one destination device ID in FIG. 4 in a case that the number is one; or there are multiple destination device IDs in FIG. 4 in a case that the number is more than one. The destination device ID in FIG. 4 indicates device identification information corresponding to the device indicated by the source device ID, for example, the destination device ID may be identification information of the first MAC device in a case that the source device ID is the first identification information. In the embodiment, it is only required to send the identification information of the device to the connecting device in a case that the data packet is sent by the device, then the connecting device selects a next device configured to transmit the data packet based on the identification information and the routing table rule, and transmits the data packet to the next device.

Specifically, the first connecting device may be configured to select the destination MAC device from at least one MAC device included in the MAC array based on the first identification information and the first routing table rule.

Step 184 may further include: the second connecting device sends the data packet to the destination PHY device based on the second identification information and a second routing table rule, where the target PHY device is assigned, in accordance with the second routing table rule, to receive the data packet, and the second routing table rule is preestablished for the user information.

The second routing table rule may have a same format as the first routing table rule described above, which is not described repeatedly here. The second connecting device may select the destination PHY device from at least one PHY device included in the PHY array based on the second identification information and the second routing table rule upon acquiring the second identification information.

Step 186 may further include: the third connecting device sends the data packet to the destination PHY on the third identification information and a third routing table rule, where the destination RF device is assigned, in accordance with the third routing table rule, to receive the data packet, and the third routing table rule is pre-established for the user information.

The third routing table rule may have a same format as the first routing table rule described above, and which is not described repeatedly here. The third connecting device may select the destination RF device from at least one RF device included in the RF array based on the third identification information and the third routing table rule upon acquiring the third identification information.

Figure 19:
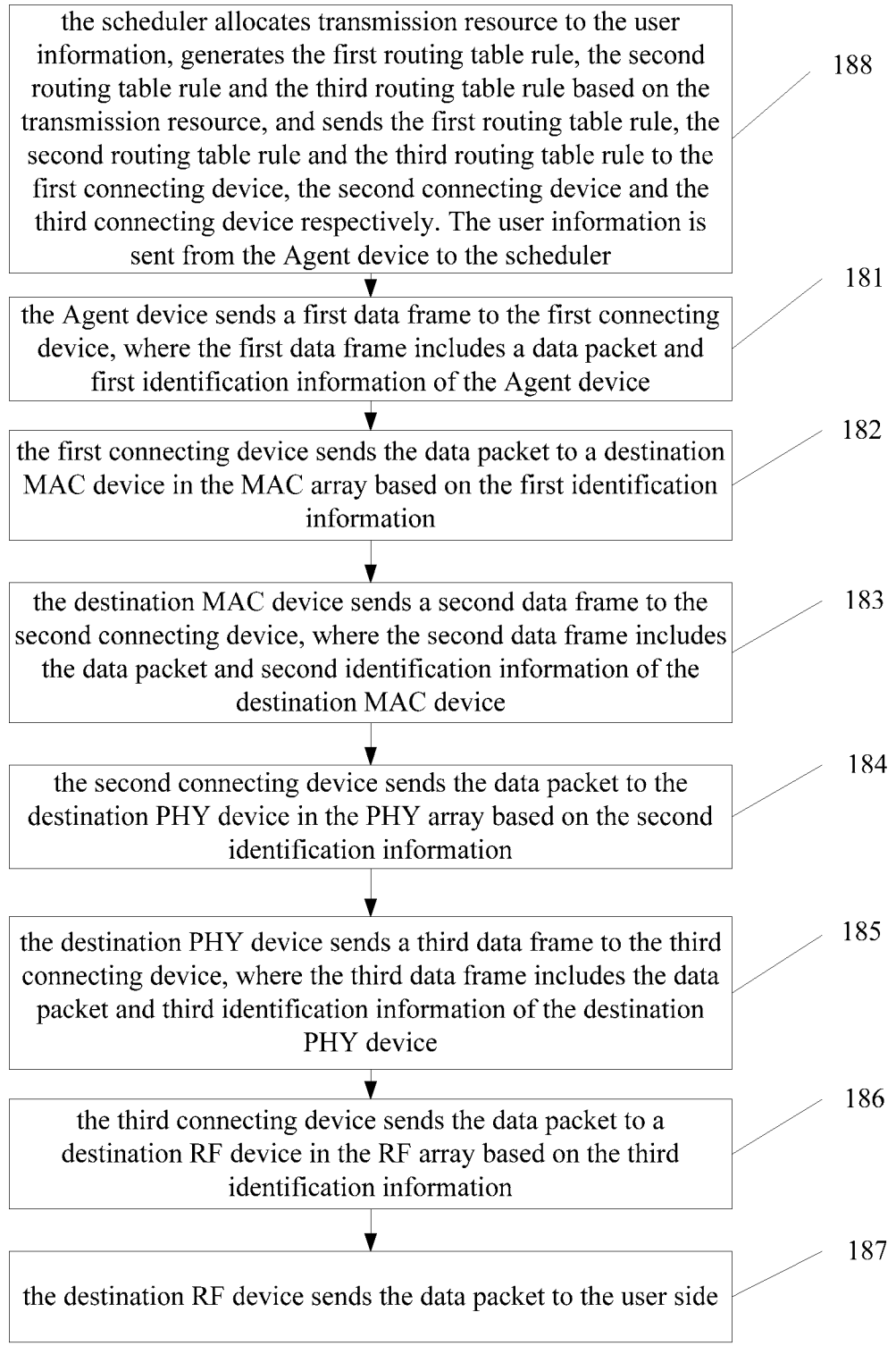
FIG. 19 is a schematic flowchart of another data packet transmission method according to the embodiments of the present disclosure.

As an optional embodiment, the system may further include a scheduler. The first routing table rule, the second routing table rule and the third routing table rule may all be established by the scheduler. As shown in FIG. 19, before step 182, the method may further include step 188.

In step 188, the scheduler allocates transmission resource to the user information, generates the first routing table rule, the second routing table rule and the third routing table rule based on the transmission resource, and sends the first routing table rule, the second routing table rule and the third routing table rule to the first connecting device, the second connecting device and the third connecting device respectively. The user information is sent from the Agent device to the scheduler.

The transmission resource is allocated to the user information. And the allocated resource may be configured to transmit the data packet. The allocation may be to select a transmission path for the data packet, that is, to select an MAC device in an MAC layer configured to transmit data packet, a PHY device in a PHY layer is configured to transmit data packet, and a RF device in an RF layer configured to transmit data packet. The destination MAC device is selected from the MAC array, the destination PHY device is selected from the PHY array, and the destination RF device is selected from the RF array. In a case that the first connecting device, the second connecting device and the third connecting device receive the first routing table rule, the second routing table rule and the third routing table rule respectively, route forwarding tables of the first connecting device 22, the second connecting device 24 and the third connecting device 26 are updated. That is, the first routing table rule, the second routing table rule and the third routing table rule are updated to the route forwarding tables of the first connecting device 22, the second connecting device 24 and the third connecting device 26, respectively. Accordingly, the Agent device, the destination MAC device, the destination PHY device and the destination RF device are connected.

The user information may include source address information and destination address information. The scheduler allocates a path from the source address to the destination address.

The scheduler may further determine whether user information exists in the scheduler upon receiving the user information. The transmission resource is allocated to the user information in a case that the user information exists in the scheduler. The user information is established in the scheduler in a case that the user information does not exist in the scheduler. Specifically, a table item may be created for the user information, and then the transmission resource is allocated to the user information.

Figure 6:
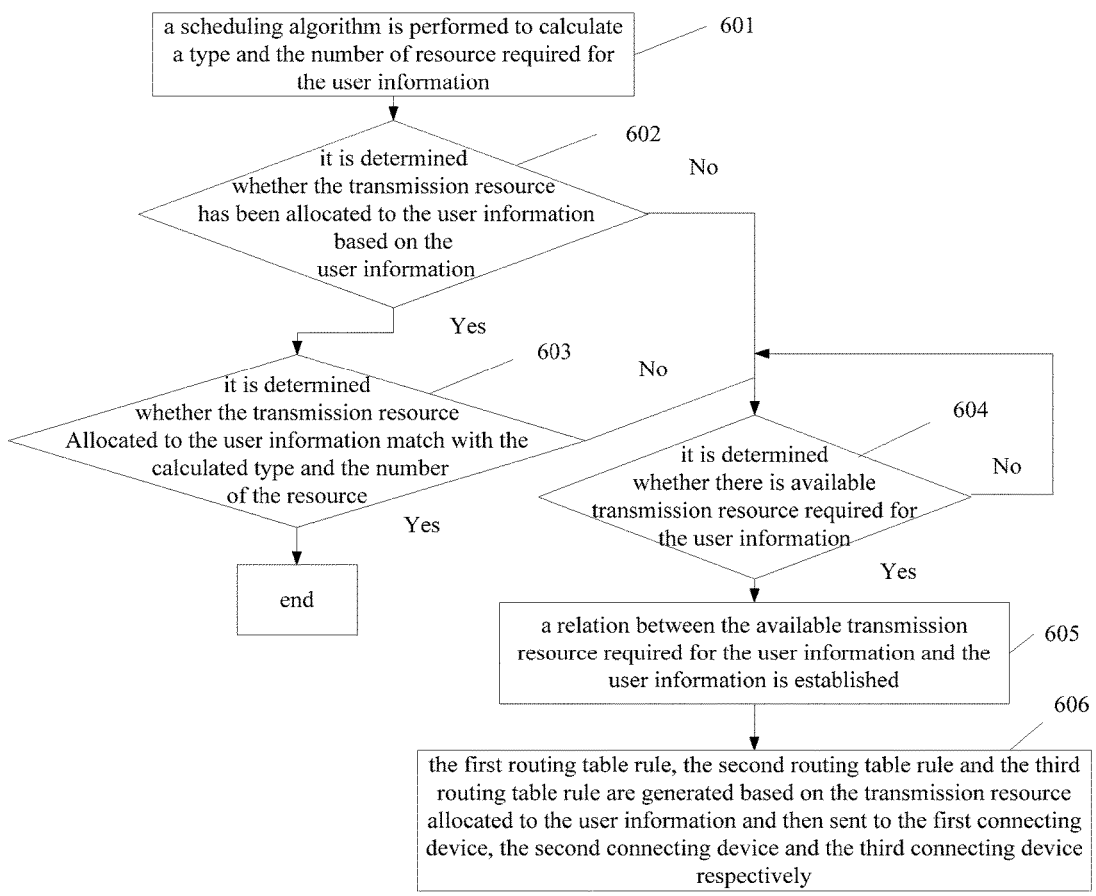
FIG. 6 is a schematic flowchart of optional transmission resources allocation according to the embodiments of the present disclosure.

A flow of allocating the transmission resource to the user information and generating the routing table rules by the scheduler may be as shown in FIG. 6, which can refer to introduction for the flow in FIG. 6 described in the above embodiment, and not described repeatedly here.

The scheduler may further update the transmission resource allocated to the user information, the user information may be all user information to which the resources are allocated and may include user information in the data packet described above, or may not include the user information in the data packet described above, that is, it is determined in step 602 that no transmission resource is allocated to the user information described above. The updating the transmission resources allocated to the user information may be to determine whether the user information does not have a data packet transmission record for a long time, then recover resources allocated to the user information which does not have the data packet transmission record for a long time, that is, to terminate a relation between the transmission resources and the user information which does not have the data packet transmission record for a long time. The updating the transmission resources allocated to the user information may also be that the scheduler will update the transmission resources allocated to the user information in a case that it is determined that in step 604 there is no available transmission resource required for the user information, in this way, the available transmission resources required for the user information may be obtained. Of course, the scheduler may further update the transmission resources allocated to the user information periodically.

As an optional embodiment, step 182 may further include: the first connecting device is configured to select at least one destination MAC device from the at least one MAC device based on the first identification information and the first routing table rule, and send the data packet to one of the at least one destination MAC device;

step 184 may further include: the second connecting device is configured to select at least one destination PHY device from the at least one PHY device based on the second identification information and the second routing table rule, and send the data packet to one of the at least one destination PHY device 251; and step 186 may further include: the third connecting device is configured to select at least one destination RF device from the at least one RF device based on the third identification information the third routing table rule, and send the data packet to one of the at least one destination RF device.

In the embodiment, there may be one or more destination MAC devices, one or more destination PHY devices, and one or more the destination RF devices. For example, a flow direction for the data packet may refer to as shown in FIG. 7, in a case that there is one destination MAC device, one destination PHY device and one destination RF device. For example, joint processing for an RF layer can be realized in a case that there is one destination MAC device, one destination PHY device, and multiple destination RF devices, as shown in FIG. 8. For example, joint processing for a PHY layer and the RF layer can be realized in a case that the there is one destination MAC device, multiple destination PHY devices, and multiple destination RF devices, as shown in FIG. 9. For example, joint processing for an MAC layer can be realized in a case that there are multiple destination MAC devices, one destination PHY device, and one destination RF device, as shown in FIG. 10.

And for example, joint processing for MAC layer, PHY layer and RF layer can be realized in a case that there are multiple destination MAC devices, multiple destination PHY devices, and multiple destination RF devices, as shown in FIG. 11.

As an optional embodiment, the MAC array may also include at least one rapid transmission MAC device and at least one dynamic transmission MAC device, the PHY array may further include at least one rapid transmission PHY device and at least one dynamic transmission PHY device, and the RF array may further include at least one rapid transmission RF device and at least one dynamic transmission RF device.

Step 182 may further include: the first connecting device transmits the data packet to the rapid transmission MAC device based on the first identification information in a case that the data packet is an unowned data packet; or transmits the data packet to an MAC device assigned, in accordance with the first routing table rule, to receive the data packet in the dynamic transmission MAC device based on the first identification information and the first routing table rule in a case that the data packet is an owned data packet. The destination MAC device is the rapid transmission MAC device in a case that the data packet is an unowned data packet; or the destination MAC device is assigned, in accordance with the first routing table rule, to receive the data packet in the dynamic transmission MAC device in a case that the data packet is an owned data packet.

Step 184 may further include: the second connecting device transmits the data packet to the rapid transmission PHY device based on the second identification information in a case that the data packet is an unowned data packet; or transmits the data packet to a PHY device assigned, in accordance with the second routing table rule, to receive the data packet in the dynamic transmission PHY device based on the second identification information and the second routing table rule in a case that the data packet is an owned data packet. The destination PHY device is a rapid transmission PHY device in a case that the data packet is an unowned data packet; or the destination PHY device is assigned, in accordance with the second routing table rule, to receive the data packet in the dynamic transmission PHY device in a case that the data packet is an owned data packet.

Step 186 may further include: the third connecting device transmits the data packet to the rapid transmission RF device based on the third identification information in a case that the data packet is an unowned data packet; or transmits the data packet to an RF device assigned, in accordance with the third routing table rule, to receive the data packet in the dynamic transmission RF device based on the third identification information and the third routing table rule in a case that the data packet is an owned data packet. The destination RF device is a rapid transmission RF device in a case that the data packet is an unowned data packet; or the destination RF device is assigned, in accordance with the third routing table rule, to receive the data packet in the dynamic transmission RF device in a case that the data packet is an owned data packet.

Specifically, the unowned data packet refers to a data packet for which no routing table rule is established by the system. That is, a data packet including the user information having no routing table rule is an unowned data packet; and the owned data packet refers to a data packet for which a routing table rule is established by the system, that is, a data packet including the user information having a routing table rule is an owned data packet.

Two transmission paths are provided in the embodiment, that is, a rapid transmission path for the data packet is provided in advance, which is a static path consisting of the Agent device, the first connecting device, the rapid transmission MAC device, the second connecting device, the rapid transmission PHY device, the third connecting device and the rapid transmission RF device. In the embodiment, a dynamic transmission path for the data packet may further be provided, which is a dynamic path consisting of the Agent device, the first connecting device, the dynamic transmission MAC device, the second connecting device, the dynamic transmission PHY device, the third connecting device and the dynamic transmission RF device.

According to the technical solution described above, multiple optional embodiments are added on a basis of the above embodiments, which can all solve the problem of performance bottleneck in WiFi networking.

Figure 20:
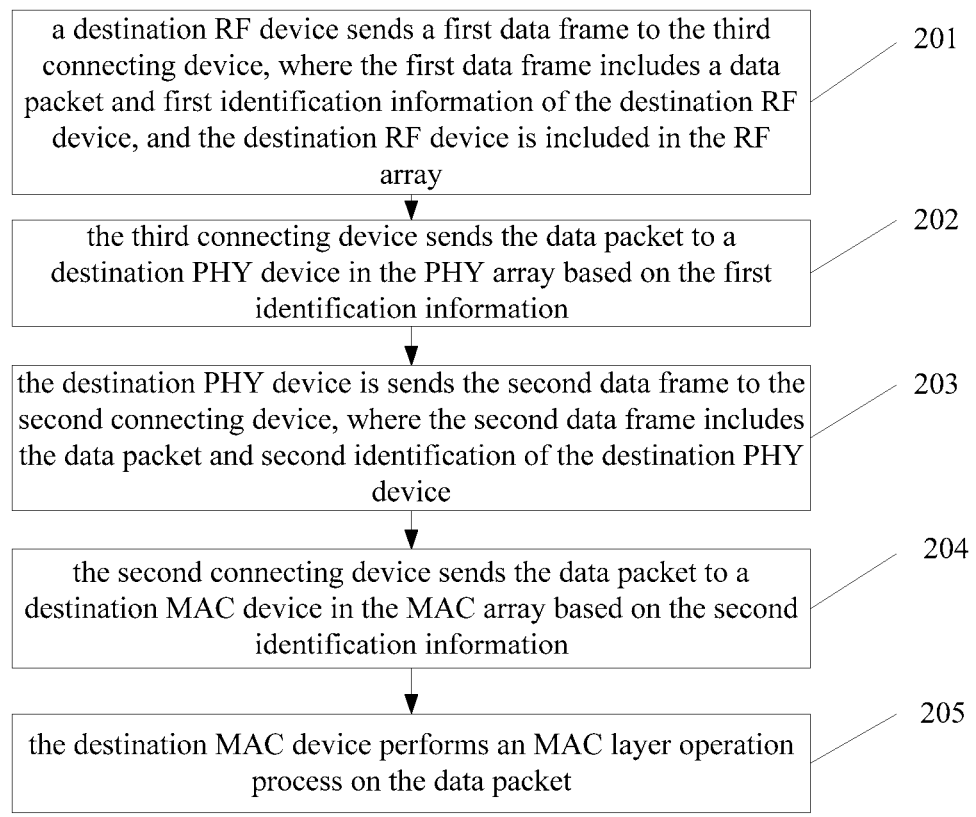
FIG. 20 is a schematic flowchart of another data packet transmission method according to the embodiments of the present disclosure.

FIG. 20 is a schematic flowchart of a data transmission method according to the embodiments of the present disclosure, the data transmission method is applied to a data transmission system, the data transmission system includes: an MAC array including at least one MAC device, a second connecting device, a PHY array including at least one PHY device, a third connecting device and an RF array including at least one RF device, as shown in FIG. 20, the method includes steps 201 to 205.

In step 201, a destination RF device sends a first data frame to the third connecting device, where the first data frame includes a data packet and first identification information of the destination RF device, and the destination RF device is included in the RF array.

The destination RF device may generate the first data frame including the first identification information and the data packet, the first identification information may be a frame header of the data packet, and the frame header may further include direction information and payload (Payload) of the data packet. The direction information is used to indicate whether the data packet is transmitted from the network side to the user side or from the user side to the network side, the direction information in the embodiment of the present disclosure may be used to indicate that the data packet is transmitted from the user side to the network side. For example, an identifier "0" may indicate that the data packet is transmitted from the network side to the user side, and an identifier "1" may indicate that the data packet is transmitted from the user side to the network side. A format of a frame header of the data frame in the embodiment may be a frame header as shown in FIG. 3.

In step 202, the third connecting device sends the data packet to a destination PHY device in the PHY array based on the first identification information.

In step 203, the destination PHY device is sends the second data frame to the second connecting device, where the second data frame includes the data packet and second identification of the destination PHY device.

The destination PHY device generates the second data frame including the second identification information and the data packet upon acquiring the data packet, and a format of the data frame may have a same format as the first data frame. The first PHY device may further perform PHY layer operation on the data packet, such as, modulating, encoding, grouping and checking, and then generate the second data frame based on the data packet after the PHY layer operation and the second identification information.

In step 204, the second connecting device sends the data packet to a destination MAC device in the MAC array based on the second identification information.

In step 205, the destination MAC device performs an MAC layer operation process on the data packet.

The MAC layer operation process may include at least one of scanning, association, authentication and security.

In a case that the data packet after the MAC layer operation process is required to be returned to the user side, the data packet may be returned in a path opposite to the path in this embodiment, that is, the data packet is returned to the user side via the second connecting device, the destination PHY device, the third connecting device and the destination RF device, which can refer to a flow starting from the destination MAC device described in the above embodiment.

In the technical solution described above, the destination RF device transmits the data packet to the destination PHY device via the third connecting device, then the destination PHY device transmits the data packet to the destination MAC device via the second connecting device, and the destination MAC device performs the MAC layer operation process on the data packet. In this way, a scheduling task for the data packet can be realized by multiple devices, and therefore the problem of performance bottleneck in the WiFi networking can be solved.

Figure 21:
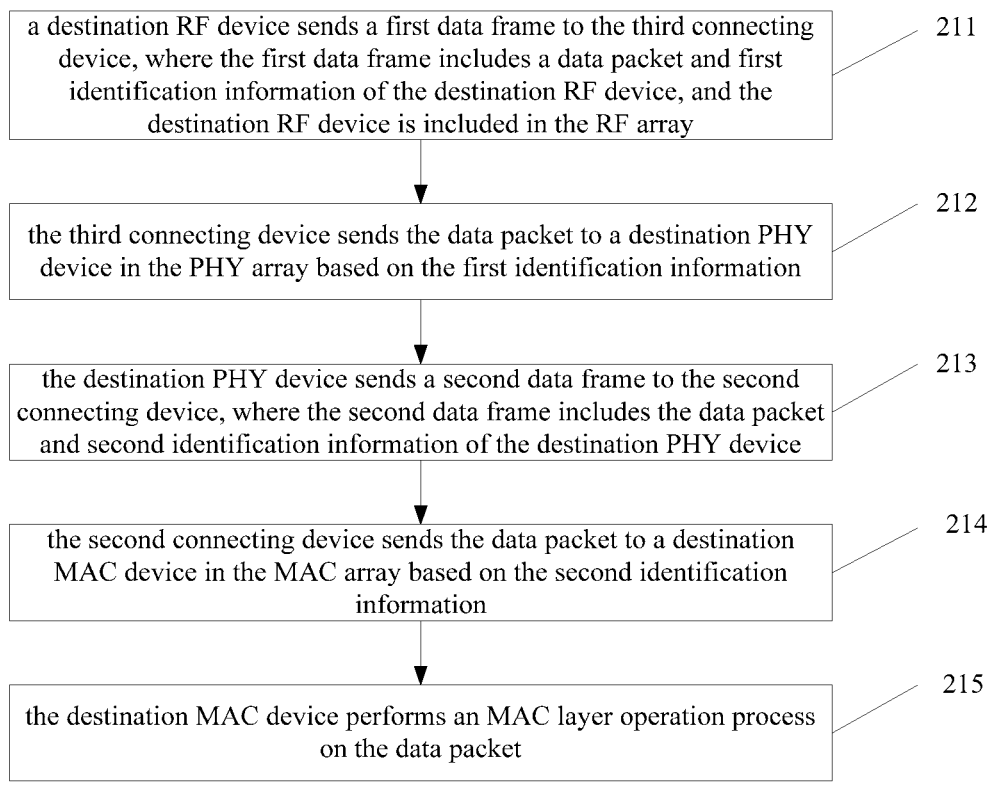
FIG. 21 is a schematic flowchart of another data packet transmission method according to the embodiments of the present disclosure.

FIG. 21 is a schematic structural view of another data transmission system according to the embodiments of the present disclosure, the data transmission method is applied to a data transmission system, the data transmission system includes: an MAC array including at least one MAC device, a second connecting device, a PHY array including at least one PHY device, a third connecting device and an RF array including at least one RF device, as shown in FIG. 21, the data transmission method includes steps 211 to 215.

In step 211, a destination RF device sends a first data frame to the third connecting device, where the first data frame includes a data packet and first identification information of the destination RF device, and the destination RF device is included in the RF array.

The destination RF device may further perform RF layer operation on the data packet, such as, a digital-to-analogue conversion, an analogue-to-digital conversion, sampling and filtering, and then generate the data frame including the data packet after the RF layer operation and the first identification information.

In step 212, the third connecting device sends the data packet to a destination PHY device in the PHY array based on the first identification information.

The third connecting device may parse the first data frame upon acquiring the data frame, to obtain the first identification information. Then, the third connecting device can know which device sends the first data frame. The third connecting device selects the destination PHY device from the at least one PHY device included in the PHY array based on the first identification information. Specifically, a way of selecting the destination PHY device may be to select a PHY device, included in the PHY array, preassigned to perform rapid transmission and as the destination PHY device; or to select an PHY device assigned, in accordance with a third routing table rule, to receive the data packet from the at least one PHY device included in the PHY array as the destination PHY device based on the first routing table rule.

In step 213, the destination PHY device sends a second data frame to the second connecting device, where the second data frame includes the data packet and second identification information of the destination PHY device.

The destination PHY device generates the second data frame including the second identification information and the data packet upon acquiring the data packet, and the data frame may have a same format as the first data frame. The destination PHY device further performs PHY layer operation on the data packet, such as, modulating, encoding, grouping and checking, and generates the second data frame based on the data packet after the PHY layer operation and the second identification information. A format of a frame header of the second data frame may be a format as shown in FIG. 3.

In step 214, the second connecting device sends the data packet to a destination MAC device in the MAC array based on the second identification information.

The second connecting device may parse the data packet upon acquiring the first data frame, to obtain the first identification information. Then, the second connecting device can know which device sends the first data frame. The second connecting device selects the destination MAC device from the at least one MAC device included in the MAC array based on the first identification information. A way of selecting the destination MAC device may be to select an MAC device, included in the MAC array, preassigned to perform rapid transmission as the destination MAC device; or to select an MAC device assigned, in accordance with a second routing table rule, to receive the data packet from the at least one MAC device included in the MAC array as the destination MAC device based on the first routing table rule.

In step 215, the destination MAC device performs an MAC layer operation process on the data packet.

The MAC layer operation process may include at least one of scanning, association, authentication and security.

As an optional embodiment, step 212 may include: the third connecting device sends the data packet to the destination PHY device based on the first identification information, where the destination PHY device is preassigned to perform rapid transmission;

step 214 may include: the second connecting device sends the data packet to the destination MAC device based on the second identification information, where the destination MAC device is preassigned to perform rapid transmission. In the embodiment, an unowned data packet may be transmitted, that is, the data packet in the embodiment may be an unowned data packet.

The data packet may further include user information; the system may further include a scheduler; after step 211, the method may include:

the third connecting device sends the user information included in the data packet to the scheduler;

the scheduler allocates transmission resources to the user information, generates the third routing table rule and the second routing table rule based on the transmission resource, and sends the third routing table rule and the second routing table rule to the third connecting device and the second connecting device, respectively. Accordingly, in a case that the data packet including the user information transmitted next time is an owned data packet, the third connecting device and the second connecting device may select the destination PHY device and the destination MAC device based on the third routing table rule and the second routing table rule, which can refer the embodiment below.

As an optional embodiment, the data packet includes user information, and the system has routing table rules established for the user information, that is, the data packet is an owned data packet; step 212 may further include: the third connecting device sends the data packet to the destination PHY device based on the first identification information and a third routing table rule, where the destination PHY device is assigned, in accordance with the routing table rule, to receive the data packet, and the first routing table rule is preestablished for the user information; and step 214 may further include: the second connecting device sends the data packet to the destination MAC device based on the second identification information and the second routing table rule, where the destination MAC device is assigned, in accordance with the second routing table rule, to receive the data packet, and the second routing table rule is preestablished for the user information.

Figure 22:
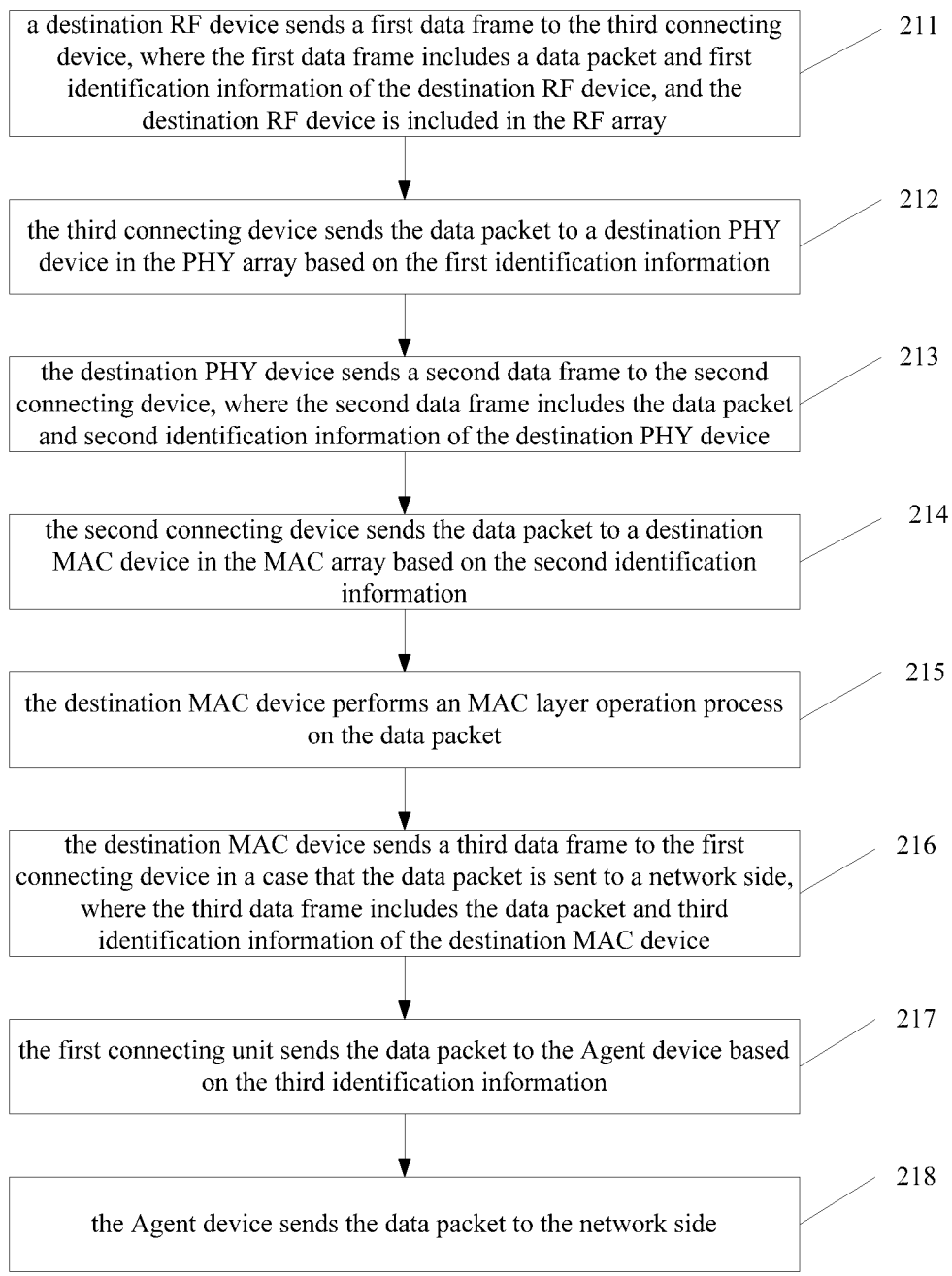
FIG. 22 is a schematic flowchart of another data packet transmission method according to the embodiments of the present disclosure.

As an optional embodiment, the system may further include a first connecting device and an Agent device, as shown in FIG. 22, the method may further include step 216 to step 218.

In step 216, the destination MAC device sends a third data frame to the first connecting device in a case that the data packet is sent to a network side, where the third data frame includes the data packet and third identification information of the destination MAC device.

In step 217, the first connecting device sends the data packet to the Agent device based on the third identification information.

In step 218, the Agent device sends the data packet to the network side.

The destination MAC device may determine whether the data packet is to be sent to the network side. For example, the destination MAC device determines that the data packet is to be sent to the network side in a case that the destination MAC device determines that the data packet is an association registration request. For example, the destination MAC device may further determine whether the data packet is sent to the network side based on the user information included in the data packet. For example, it is determined that the data packet is sent to the network side in a case that destination address information included in the user information is network side address information. Of course, it is also determined whether the data packet is sent to the network side by other method, which is not described here.

As an optional embodiment, step 217 may further include: the first connecting device sends the data packet to the Agent device based on the third identification and a third routing table rule, where the Agent device is assigned, in accordance with the third routing table rule, to receive the data packet, and the third routing table rule is preestablished for the user information. The third routing table rule may be established by the scheduler for the user information.

Before the first connecting device sends the data packet to the Agent device based on the third identification information and the first routing rule, the method may further include: the destination MAC device sends the user information to the scheduler; the scheduler allocates transmission resource to the user information, generates a first routing table rule based on the transmission resource, and send the first routing table rule to the first connecting device.

As an optional embodiment, the MAC array may further include at least one rapid transmission MAC device and at least one dynamic transmission MAC device, the PHY array may further include at least one rapid transmission PHY device and at least one dynamic transmission PHY device, and the RF array may further include at least one rapid transmission RF device and at least one dynamic transmission RF device.

Step 212 may further include: the third connecting device transmits the data packet to the rapid transmission PHY device based on the first identification information in a case that the data packet is an unowned data packet; or transmits the data packet to a PHY device assigned, in accordance with the first routing table rule, to receive the data packet in the dynamic transmission PHY device based on the first identification information and the first routing table rule in a case that the data packet is an owned data packet. That is, the destination PHY device is a rapid transmission PHY device in a case that the data packet is an unowned data packet; and the destination PHY device is a PHY device assigned, in accordance with the first routing table rule, to receive the data packet in the dynamic transmission PHY device configured in a case that the data packet is an owned data packet.

Step 214 may further include: the second connecting device transmits the data packet to the rapid transmission MAC device based on the second identification information in a case that the data packet is an unowned data packet; or transmits the data packet to an MAC device assigned, in accordance with the second routing table rule, to receive the data packet in dynamic transmission the MAC device based on the second identification information and the second routing table rule in a case that the data packet is an owned data packet. That is, the destination MAC device is a rapid transmission MAC device in a case that the data packet is an unowned data packet; or the destination MAC device is an MAC device assigned, in accordance with the second routing table rule, to receive the data packet in the dynamic transmission MAC device in a case that the data packet is an owned data packet.

Specifically, the unowned data packet refers to a data packet for which no routing table rule is established by the system, that is, a data packet including the user information having no routing table rule is an unowned data packet; and the owned data packet refers to a data packet for which a routing table rule is established by the system, that is, the data packet including the user information having a routing table rule is an owned data packet.

Two transmission paths are provided in the embodiment, a rapid transmission path for the data packet is provided in advance, which is a static path consisting of the destination RF device, the third connecting device, the rapid transmission RF device, the second connecting device, the rapid transmission MAC device, the first connecting device and the Agent device. In the embodiment, a dynamic transmission path for the data packet may further be provided, which is a dynamic path consisting of the destination RF device, the third connecting device, the dynamic transmission RF device, the second connecting device, the dynamic transmission MAC device, the first connecting device and the Agent device.

In the technical solution described above, multiple optional embodiments are added on a basis of the above embodiments, which can solve the problem of performance bottleneck in WiFi networking.

Figure 23:
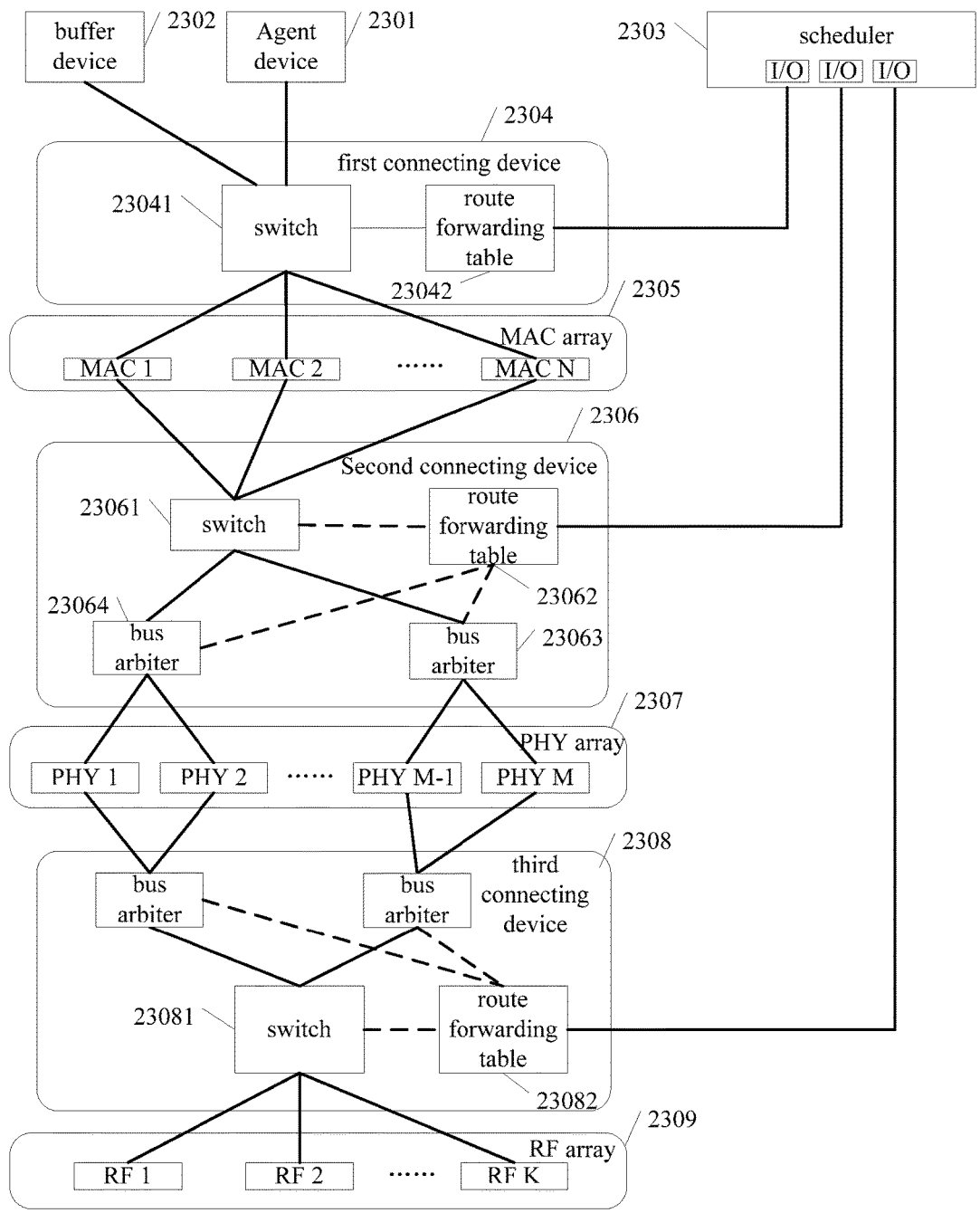
FIG. 23 is a schematic structural view of another data transmission system according to the embodiments of the present disclosure.

FIG. 23 is a schematic structural view of another data transmission system according to the embodiments of the present disclosure, as shown in FIG. 23, the data transmission system includes: an Agent device 2301, a buffer device 2302, a scheduler 2303, a first connecting device 2304, an MAC array 2305, a second connecting device 2306, a PHY array 2307, a third connecting device 2308 and an RF array 2309. Specifically, an internal structure of the Agent device 2301 is as shown in FIG. 4, which includes three CPU processors and five interfaces. An operating mode of the Agent is described as follows: the Agent device 2301 is configured to receive downlink flow (Downlink Flow) from a network side via a network interface, perform IP packet analysis processing on the downlink flow, and then send and buffer the downlink flow into the buffer device 2302 via a buffer interface. The buffer device 2302 is configured to buffer data parsed by the Agent device 2301; or the Agent device 2301 may be further configured to receive uplink flow (Uplink Flow) from the MAC array 2305 below (sent by the first connecting device 2304) via an MAC interface, perform IP layer processing on the uplink flow, and then send the uplink flow to the network side via a network interface.

Figure 24:
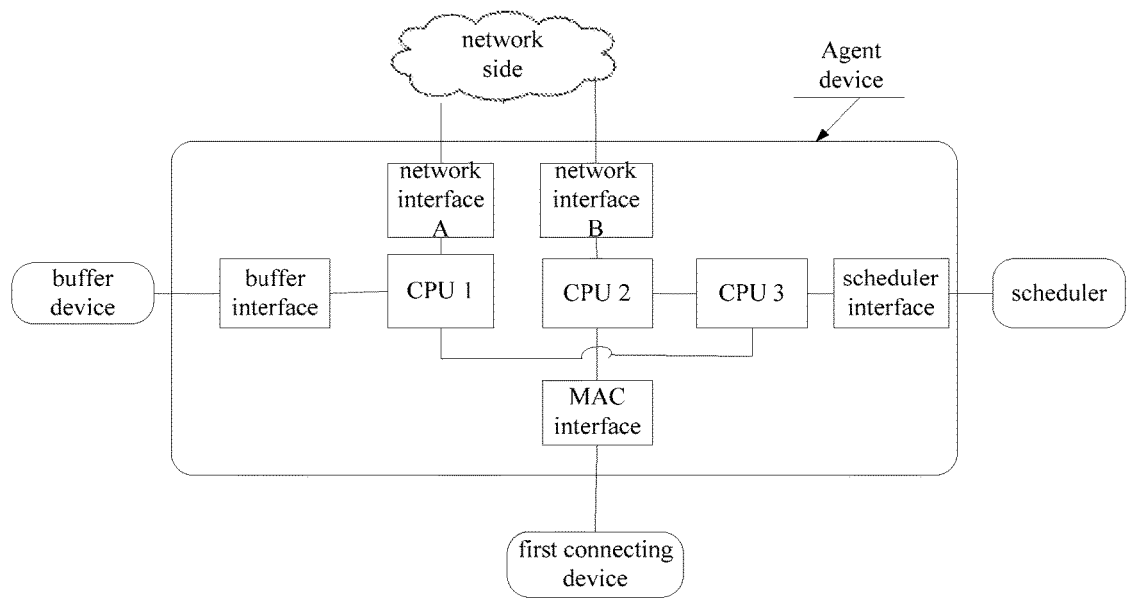
FIG. 24 and FIG. 25 are schematic structural views of optional components according to the embodiments of the present disclosure.

The Agent device 2301 may have a structure as shown in FIG. 24, which includes three CPU processors and five interfaces. An operating mode of the Agent device is that the downlink flow (Downlink Flow) from the network enters a CPU1 via a network interface A, and IP packet analysis processing is performed on the downlink flow in CPU1, and then the downlink flow enters a buffer device 2302c via the buffer interface; or the uplink flow (Uplink Flow) from the MAC array 2305 below (sent by the first connecting device 2304) enters CPU2 via the MAC interface, IP layer processing is performed on the uplink flow in the CPU2, and then the uplink down enters the network side via the network interface B.

CPU1 informs CPU3 of information obtained by the IP parsing, and CPU2 also informs the CPU3 of information reported by an MAC layer. The CPU3 performs interaction operation with the scheduler 2303 via a scheduler interface based an algorithm strategy, so that the scheduler 2302 realizes operations such as user information establishment, user information delete, resource allocation or resource recovery, which can refer to a process describe in the above embodiment.

The Agent device 2301 may include the Agent device described in the above embodiments and/or a first Agent device. The Agent device 2301 can complete all operation performed by the Agent device and/or the first Agent device.

The scheduler 2303 is configured to receive user information sent by the Agent device 2301, create the user information, allocate transmission resource to the user information, and generate routing table rules, such as the first routing table rule, the second routing table rule and the third routing table rule described in the above embodiments, based on the transmission resource allocated to the user information, which can refer to a process described in the above embodiment.

Figure 25:
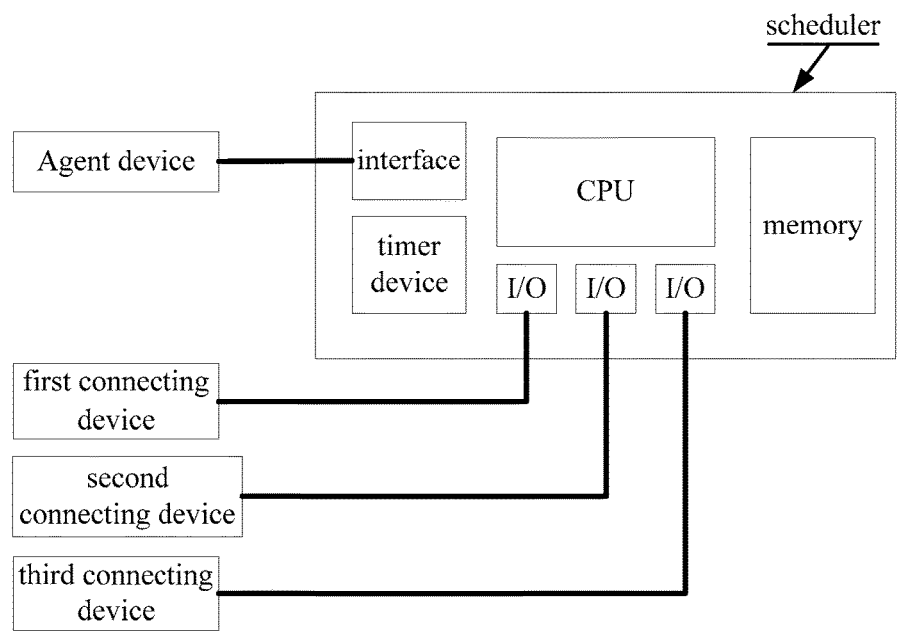

The scheduler 2302 may have a structure as shown in FIG. 25, which includes a CPU, a memory, a timer, an interface with an IP agent (connecting to the Agent device), and I/O interfaces connecting to routing tables of three connecting devices respectively.

The scheduler 2303 may include the scheduler described in the above embodiment.

A first connecting device 2304 is configured to forward the data packet based on a route forwarding table 23042 of the first connecting device 2304, and the route forwarding table 23042 includes the first routing table rule described in the above embodiments; the first connecting device 2304 includes a switch 23041 and the route forwarding table 23042. The first connecting device 2304 may include the first connecting device described in the above embodiments. The first connecting device 2304 may complete all operation performed by the first connecting device described in the above embodiments.

The MAC array 2305 includes multiple MAC devices, and at least includes the first MAC device and/or the second MAC device described in the above embodiments. The MAC array 2305 may complete all operation performed by the first MAC device and/or the second MAC device described in the above embodiments.

The second connecting device 2306 is configured to forward the data packet based on a route forwarding table 23062 of the second connecting device 2306, and the route forwarding table 23062 includes the second routing table rule described in the above embodiments; the second connecting device 2306 includes a switch 23061, the route forwarding table 23062, and a bus arbiter 23063. The second connecting device 2306 may include the second connecting device described in the above embodiments. The second connecting device 2306 may complete all operation performed by the second connecting device described in the above embodiments.

The PHY array 2307 includes multiple PHY devices, and at least includes first PHY device and/or the second PHY device described in the above embodiments. The PHY array 2307 may complete all operation performed by the first PHY device and/or the second PHY device described in the above embodiments.

The third connecting device 2308 is configured to forward the data packet based on a route forwarding table 23082 of the third connecting device 2308, and the route forwarding table 23082 includes the third routing table rule described in the above embodiments; the third connecting device 2308 includes a switch 23081, the route forwarding table 23082, and a bus arbiter 23083. The third connecting device 2308 may include the third connecting device described in the above embodiments. The third connecting device 2308 may complete all operation performed by the third connecting device described in the above embodiments.

The RF array 2309 includes multiple RF devices, and at least includes first RF device and/or the second RF device described in the above embodiments. The RF array 2309 may complete all operation performed by the first RF device and/or the second RF device described in the above embodiments.

In the system, the data packet sent from the network side can be transmitted to the user side, that is, the Agent device 2301 sends the data packet sent from the network to the first connecting device 2304, the first connecting device 2304 sends the data packet to an MAC device corresponding to the Agent device 2301 in the MAC array 2305, the MAC device sends the data packet to the second connecting device 2306, the second connecting device 2306 sends the data packet to a PHY device corresponding to the MAC device in the PHY array 2307, the PHY device sends the data packet to the third connecting device 2308, the third connecting device 2308 sends the data packet to an RF device corresponding to the PHY device in the RF array 2309, and the RF device sends the data packet to the user side.

In the system, the data packet sent from the user side is transmitted to the system or the network side, that is, an RF device in the RF array 2309 configured to receive the data packet sent from the user side sends the data packet to the third connecting device 2308, the third connecting device 2308 sends the data packet to an PHY device in the PHY array 2307 corresponding to the RF device, the PHY device sends the data packet to the second connecting device 2306, the second connecting device 2306 sends the data packet to an MAC device in the MAC array 2305 corresponding to the PHY device, the MAC device performs an MAC layer operation process on the data packet, the data packet after the operation process may be returned to the user side, or may be sent to the first connecting device 2303, the first connecting device 2303 sends the data packet to the Agent device, and the Agent device sends the data packet to the network side. A forwarding process by the connecting devices described above may refer to the process described in the above embodiment, which is not described repeatedly here.

It can be understood by those skilled in the art that all of or a part of steps of the above embodiment methods may be realized by hardware instructed by a computer program. The program may be stored in a computer readable storage medium. The program may include the flows of the above method embodiments when being executed. The storage medium may include a magnetic disc, an optical disc, a read only memory (Read-Only Memory, ROM), a random access memory (Random Access Memory, RAM) and so on.

The foregoing are only preferred embodiments of the present disclosure and therefore are not intended to limit the scope of the present disclosure. Therefore, equivalent changes made according to the claims of the present disclosure still fall within the scope of the present disclosure.

What is claimed is:

1. A data transmission system, comprising:
   an agent device,
   a first connecting device,
   a media access control layer (MAC) array comprising at least one MAC device,
   a second connecting device,
   a physical layer (PHY) array comprising at least one PHY device,
   a third connecting device, and
   a radio frequency (RF) array comprising at least one RF device,
   wherein:
   the agent device is configured to send a first data frame to the first connecting device, wherein the first data frame comprises a data packet and first identification information of the agent device;
   the first connecting device is configured to send the data packet to a destination MAC device in the MAC array based on the first identification information;
   the destination MAC device is configured to send a second data frame to the second connecting device, wherein the second data frame comprises the data packet and second identification information of the destination MAC device;
   the second connecting device is configured to send the data packet to a destination PHY device in the PHY array based on the second identification information;
   the destination PHY device is configured to send a third data frame to the third connecting device, wherein the third data frame comprises the data packet and third identification information of the destination PHY device;
   the third connecting device is configured to send the data packet to a destination RF device in the RF array based on the third identification information; and
   the destination RF device is configured to send the data packet to a user side.

2. The system according to claim 1, wherein:
   the first connecting device is configured to send the data packet to the destination MAC device based on the first identification information, wherein the destination MAC device is preassigned to perform rapid transmission;
   the second connecting device is configured to send the data packet to the destination PHY device based on the second identification information, wherein the destination PHY device is preassigned to perform rapid transmission; and
   the third connecting device is configured to send the data packet to the destination RF device based on the third identification information, wherein the destination RF device is preassigned to perform rapid transmission.

3. The system according to claim 1, wherein
   the data packet comprises user information, and the system has routing table rules established for the user information;
   the first connecting device is configured to send the data packet to the destination MAC device based on the first identification information and a first routing table rule, wherein the destination MAC device is assigned, in accordance with the first routing table rule, to receive the data packet, and the first routing table rule is preestablished for the user information;
   the second connecting device is configured to send the data packet to the destination PHY device based on the second identification information and a second routing table rule, wherein the destination PHY device is assigned, in accordance with the second routing table rule, to receive the data packet, and the second routing table rule is preestablished for the user information; and
   the third connecting device is configured to send the data packet to the destination RF device based on the third identification information and a third routing table rule, wherein the destination RF device is assigned, in accordance with the third routing table rule, to receive the data packet, and the third routing table rule is preestablished for the user information.

4. The system according to claim 3, further comprising:
   a scheduler, configured to allocate transmission resource for the user information, generate the first routing table rule, the second routing table rule, and the third routing table rule based on the transmission resource, and send the first routing table rule, the second routing table rule and the third routing table to the first connecting device, the second connecting device and the third connecting device, respectively; and
   the agent device is further configured to send the user information to the scheduler.

5. The system according to claim 3, wherein the user information comprises:
   source address information and destination address information.

6. The system according to claim 3, wherein the first connecting device is further configured to select at least one destination MAC device from the at least one MAC device based on the first identification information and the first routing table rule, and send the data packet to one of the at least one destination MAC device;
   the second connecting device is further configured to select at least one destination PHY device from the at least one PHY device based on the second identification information and the second routing table rule, and send the data packet to one of the at least one destination PHY device; and
   the third connecting device is further configured to select at least one destination RF device from the at least one RF device based on the third identification information and the third routing table rule, and send the data packet to one of the at least one destination RF device.

7. A data transmission system, comprising:
   a media access control layer (MAC) array comprising at least one MAC device,
   a second connecting device,
   a physical layer (PHY) array comprising at least one PHY device, a third connecting device, and
a radio frequency (RF) array comprising at least one RF device,
wherein:
a destination RF device is configured to send a first data frame to the third connecting device, wherein the first data frame comprises a data packet and first identification information of the destination RF device, and the destination RF device is included in the RF array;
the third connecting device is configured to send the data packet to a destination PHY device in the PHY array based on the first identification information;
the destination PHY device is configured to send a second data frame to the second connecting device, wherein the second data frame comprises the data packet and second identification information of the destination PHY device;
the second connecting device is configured to send the data packet to a destination MAC device in the MAC array based on the second identification information; and
the destination MAC device is configured to perform an MAC layer operation process on the data packet.

8. The system according to claim 7, further comprising:
a first connecting device and an agent device,
wherein:
the destination MAC device is further configured to send a third data frame to the first connecting device in a case that the data packet is sent to a network side, wherein the third data frame comprises the data packet and third identification information of the destination MAC device;
the first connecting device is configured to send the data packet to the agent device based on the third identification information; and
the agent device is configured to send the data packet to the network side.

9. The system according to claim 8, wherein
the data packet comprises user information, and the system has routing table rules established for the user information;
the third connecting device is configured to send the data packet to the destination PHY device based on the first identification information and a third routing table rule, wherein the destination PHY device is assigned, in accordance with the third routing table rule, to receive the data packet, and the third routing table rule is preestablished for the user information;
the second connecting device is configured to send the data packet to the destination MAC device based on the second identification information and a second routing table rule, wherein the destination MAC device is assigned, in accordance with the second routing table rule, to receive the data packet, and the second routing table rule is preestablished for the user information; and
the first connecting device is configured to send the data packet to the agent device based on the third identification information and a first routing table rule, wherein the agent device is assigned, in accordance with the third routing table rule, to receive the data packet, and the third routing table rule preestablished for the user information.

10. The system according to claim 9, further comprising a scheduler, wherein
the destination MAC device is further configured to send the user information to the scheduler; and
the scheduler is further configured to allocate transmission resource to the user information, generate the first routing table rule based on the transmission resource, and send the first routing table rule to the first connecting device.

11. The system according to claim 7, wherein
the third connecting device is configured to send the data packet to the destination PHY device based on the first identification information, wherein the destination PHY device is preassigned to perform rapid transmission; and
the second connecting device is configured to send the data packet to the destination MAC device based on the second identification information, wherein the target MAC device is preassigned to perform rapid transmission.

12. The system according to claim 11, wherein the data packet comprises user information, the system further comprising a scheduler, wherein:
the third connecting device is further configured to send the user information comprised in the data packet to the scheduler; and
the scheduler is configured to allocate transmission resource to the user information, generate a third routing table rule and a second routing table rule based on the transmission resource, and send the third routing table rule and the second routing table rule to the third connecting device and the second connecting device, respectively.

13. A data transmission method applied to a data transmission system, wherein the system comprises an agent device, a first connecting device, a media access control layer (MAC) array comprising at least one MAC device, a second connecting device, a physical layer (PHY) array comprising at least one PHY device, a third connecting device and a radio frequency (RF) array comprising at least one RF device, the method comprising:
sending, by the agent device, a first data frame to the first connecting device, wherein the first data frame comprises a data packet and first identification information of the agent device;
sending, by the first connecting device, the data packet to a destination MAC device in the MAC array based on the first identification information;
sending, by the destination MAC device, a second data frame to the second connecting device, wherein the second data frame comprises the data packet and second identification information of the destination MAC device;
sending, by the second connecting device, the data packet to a destination PHY device in the PHY array based on the second identification information;
sending, by the destination PHY device, a third data frame to the third connecting device, wherein the third data frame comprises the data packet and third identification information of the destination PHY device;
sending, by the third connecting device, the data packet to a destination RF device in the RF array based on the third identification information; and
sending, by the destination RF device, the data packet to a user side.

14. The method according to claim 13, wherein
the sending, by the first connecting device, the data packet to the destination MAC device in the MAC array based on the first identification information comprises:
sending, by the first connecting device, the data packet to the destination MAC device based on the first identification information, wherein the destination MAC device is preassigned to perform rapid transmission;

the sending, by the second connecting device, the data packet to the destination PHY device in the PHY array based on the second identification information comprises:

sending, by the second connecting device, the data packet to the destination PHY device based on the second identification information, wherein the destination PHY device is preassigned to perform rapid transmission; and the sending, by the third connecting device, the data frame to the destination RF device in the RF array based on the third identification information comprises:

sending, by the third connecting device, the data frame to the destination RF device based on the third identification information, wherein the destination RF device is preassigned to perform rapid transmission.

15. The method according to claim 13, wherein the data packet comprises user information, and the system has routing table rules established for the user information, wherein:

the sending, by the first connecting device, the data packet to the destination MAC device in the MAC array based on the first identification information comprises:

sending, by the first connecting device, the data packet to the destination MAC device based on the first identification information and a first routing table rule, wherein the destination MAC device is assigned, in accordance with the first routing table rule, to receive the data packet, and the first routing table rule is preestablished for the user information;

the sending, by the second connecting device, the data packet to the destination PHY device in the PHY array based on the second identification information comprises:

sending, by the second connecting device, the data packet to the destination PHY device based on the second identification information and a second routing table rule, wherein the destination PHY device is assigned, in accordance with the second routing table rule, to receive the data packet, and the second routing table rule is preestablished for the user information; and the sending, by the third connecting device, the data frame to the destination RF device in the RF array based on the third identification information comprises:

sending, by the third connecting device, the data packet to the destination RF device based on the third identification information and a third routing table rule, wherein the destination RF device is assigned, in accordance with the third routing table rule, to receive the data packet, and the third routing table rule is preestablished for the user information.

16. The method according to claim 15, wherein before the sending, by the first connecting device, the data packet to the destination MAC device in the MAC array based on the first identification information and the first routing table rule, the method further comprises:

allocating, by a scheduler, transmission resource to the user information;

generating, by the scheduler, the first routing table rule, the second routing table rule, and the third routing table rule based on the transmission resource, and sending, by the scheduler, the first routing table rule, the second routing table rule and the third routing table rule to the first connecting device, the second connecting device and the third connecting device, respectively, wherein the user information is sent by the agent device to the scheduler.

17. The method according to claim 15, wherein the user information comprises:

source address information and destination address information.

18. The method according to claim 15, wherein the sending, by the first connecting device, the data packet to the destination MAC device based on the first identification information and the first routing table rule comprises:

selecting, by the first connecting device, at least one destination MAC device from the at least one MAC device based on the first identification information and the first routing table rule, and sending the data packet to one of the at least one destination MAC device;

the sending, by the second connecting device, the data packet to the destination PHY device based on the second identification information and the second routing table rule comprises:

selecting, by the second connecting device, at least one destination PHY device from the at least one PHY device based on the second identification information and the second routing table rule, and sending the data packet to one of the at least one destination PHY device; and the sending, by the third connecting device, the data frame to the destination RF device based on the third identification information and the third routing table rule comprises:

selecting, by the third connecting device, at least one destination RF device from the at least one RF device based on the third identification information and the third routing table rule, and sending the data packet to one of the at least one destination RF device.

19. A data transmission method applied to a data transmission system, wherein the system comprises a media access control layer (MAC) array comprising at least one MAC device, a second connecting device, a physical layer (PHY) array comprising at least one PHY device, a third connecting device and a radio frequency (RF) array comprising at least one RF device, the method comprising:

sending, by a destination RF device, a first data frame to the third connecting device, wherein the first data frame comprises a data packet and first identification information of the destination RF device, and the destination RF device included in the RF array;

sending, by the third connecting device, the data packet to a destination PHY device in the PHY array based on the first identification information;

sending, by the destination PHY device, a second data frame to the second connecting device, wherein the second data frame comprises the data packet and second identification information of the destination PHY device;

sending, by the second connecting device, the data packet to a destination MAC device in the MAC array based on the second identification information; and performing, by the destination MAC device, an MAC layer operation process on the data packet.

20. The method according to claim 19, wherein the system further comprises: a first connecting device and an agent device, wherein:
- the destination MAC device is configured to send a third data frame to the first connecting device in a case that the data packet is sent to a network side, wherein the third data frame comprises the data packet and third identification information of the destination MAC device;
- the first connecting device is configured to send the data packet to the agent device based on the third identification information; and
- the agent device is configured to send the data packet to the network side.

* * * * *